Figure 1:
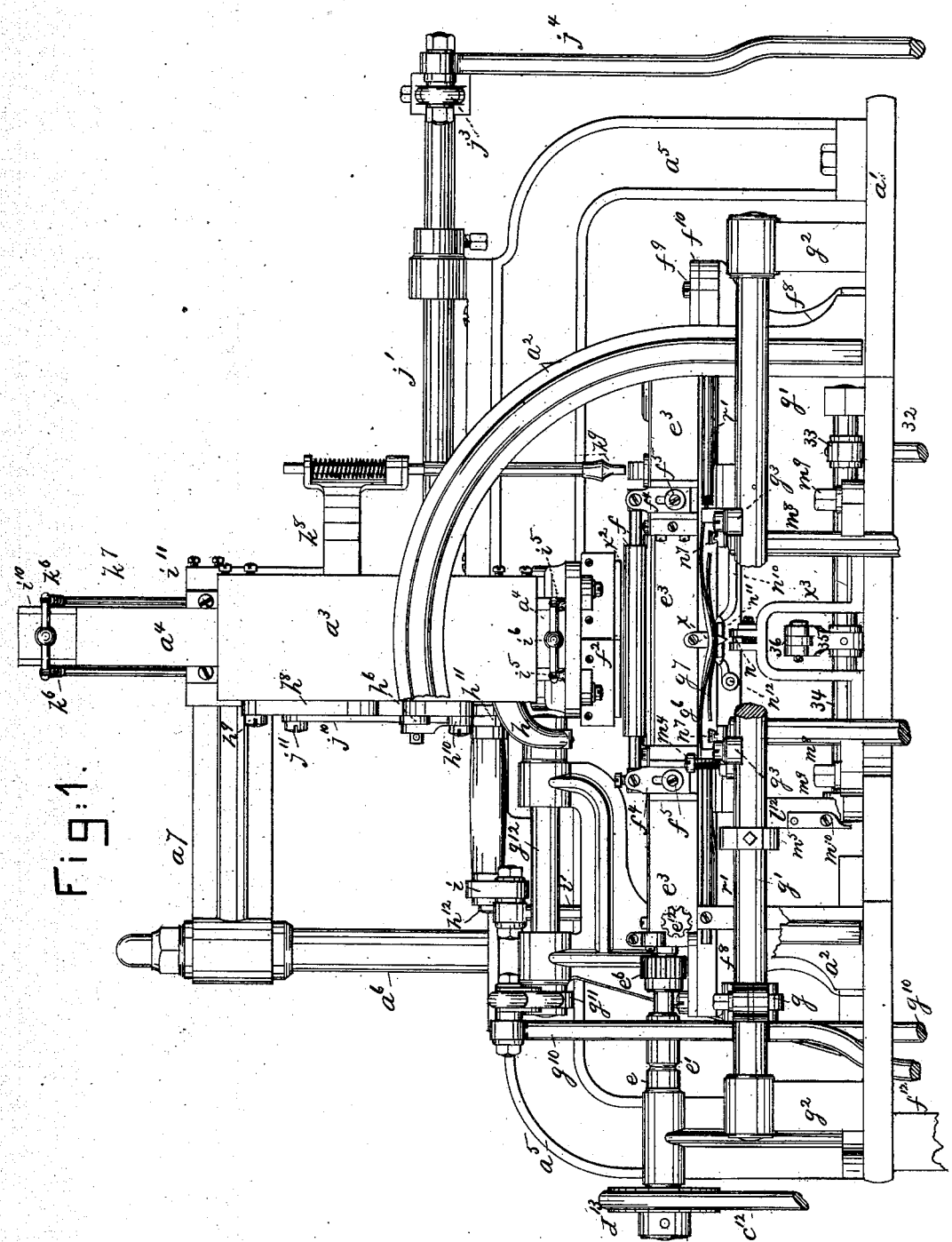

E. PITTMANN.
Envelope Machine.

No. 235,453.　　　　　Patented Dec. 14, 1880.

Witnesses.
H. T. Connor.
Jos. P. Livermore.

Inventor.
Edward Pittmann
by Crosby & Gregory
Attys.

E. PITTMANN.
Envelope Machine.
No. 235,453. Patented Dec. 14, 1880.
17 Sheets—Sheet 2.
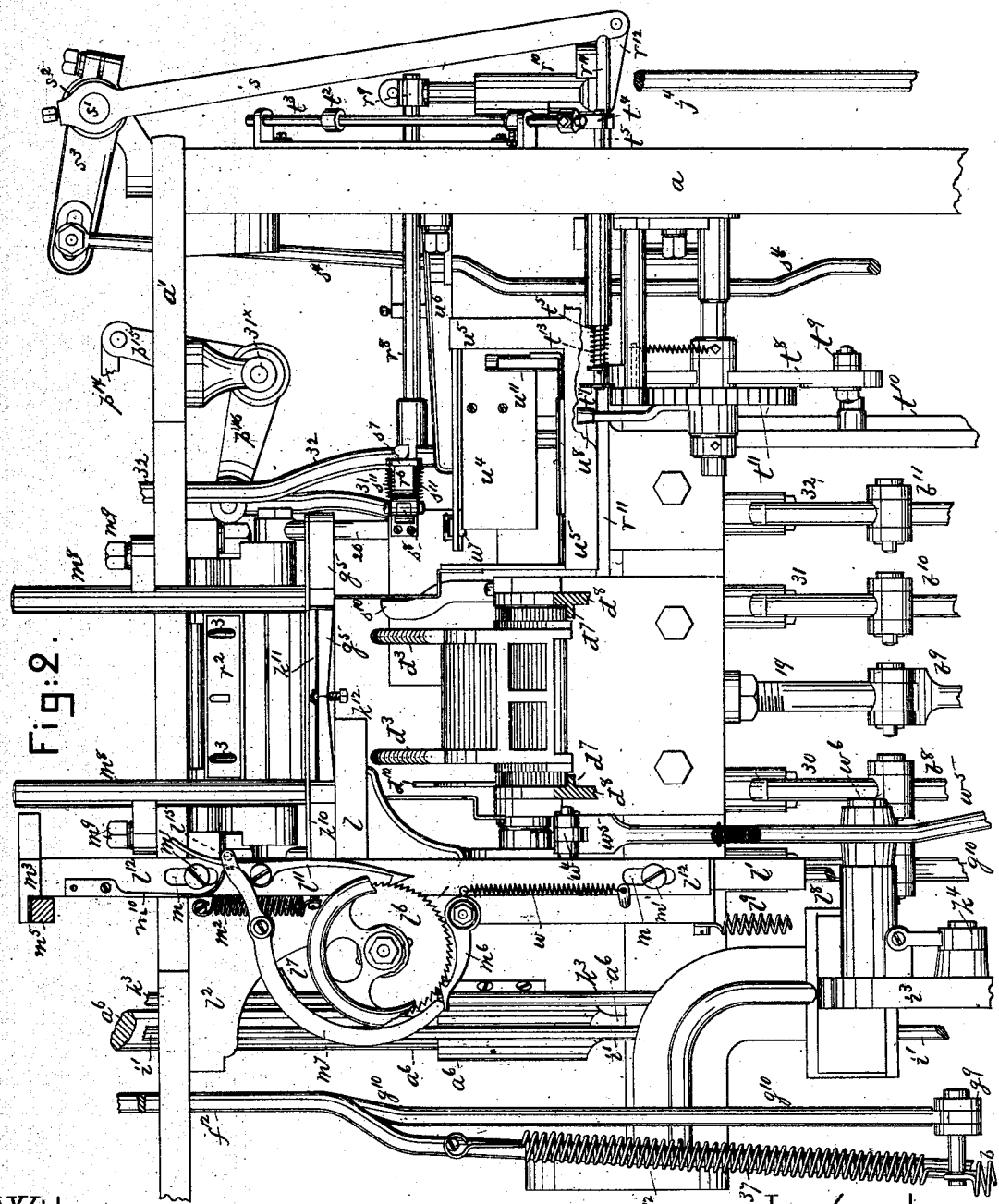
Witnesses.
L. F. Connor.
Jos. P. Livermore.
Inventor.
Edward Pittmann
by Crosby & Gregory
Attys

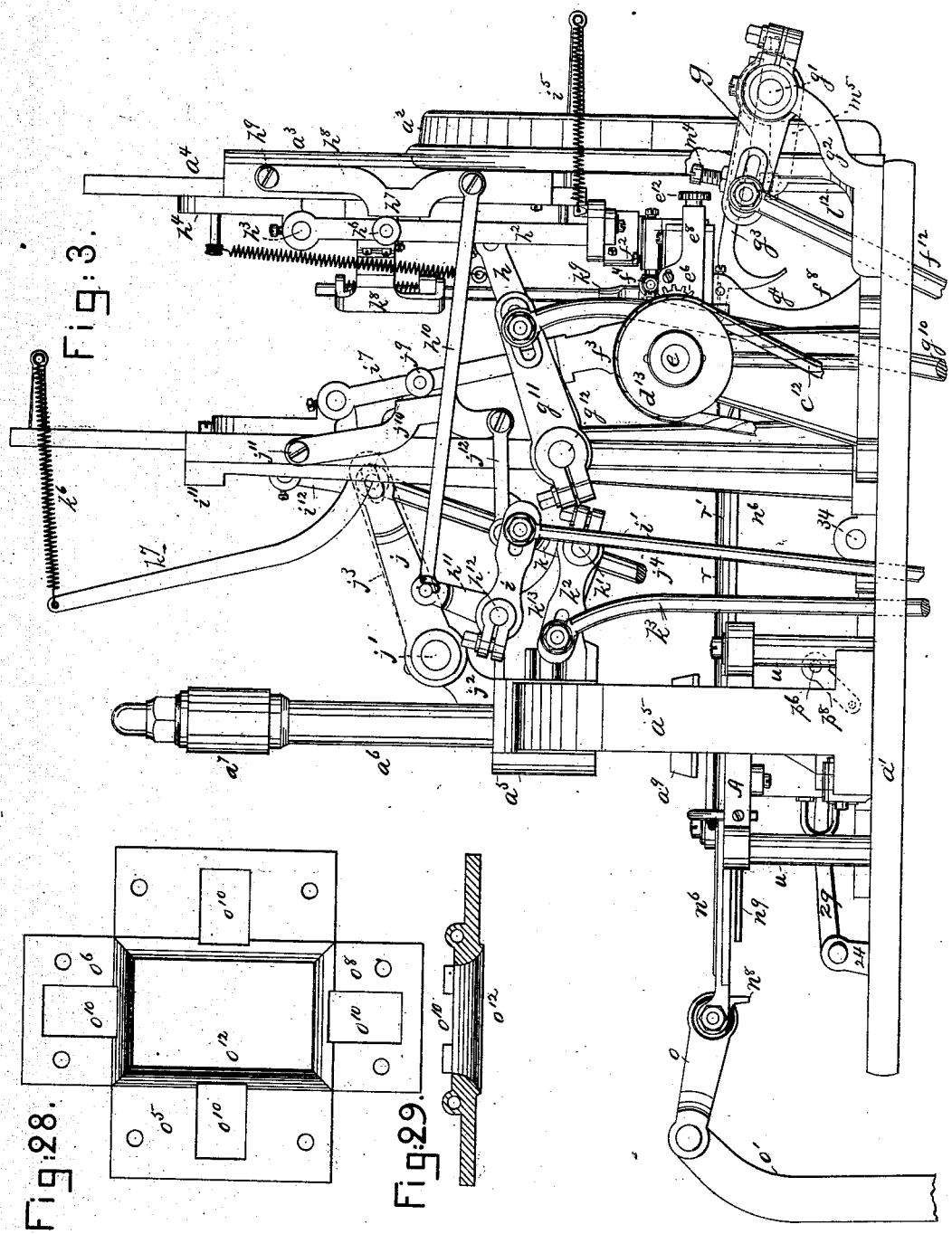

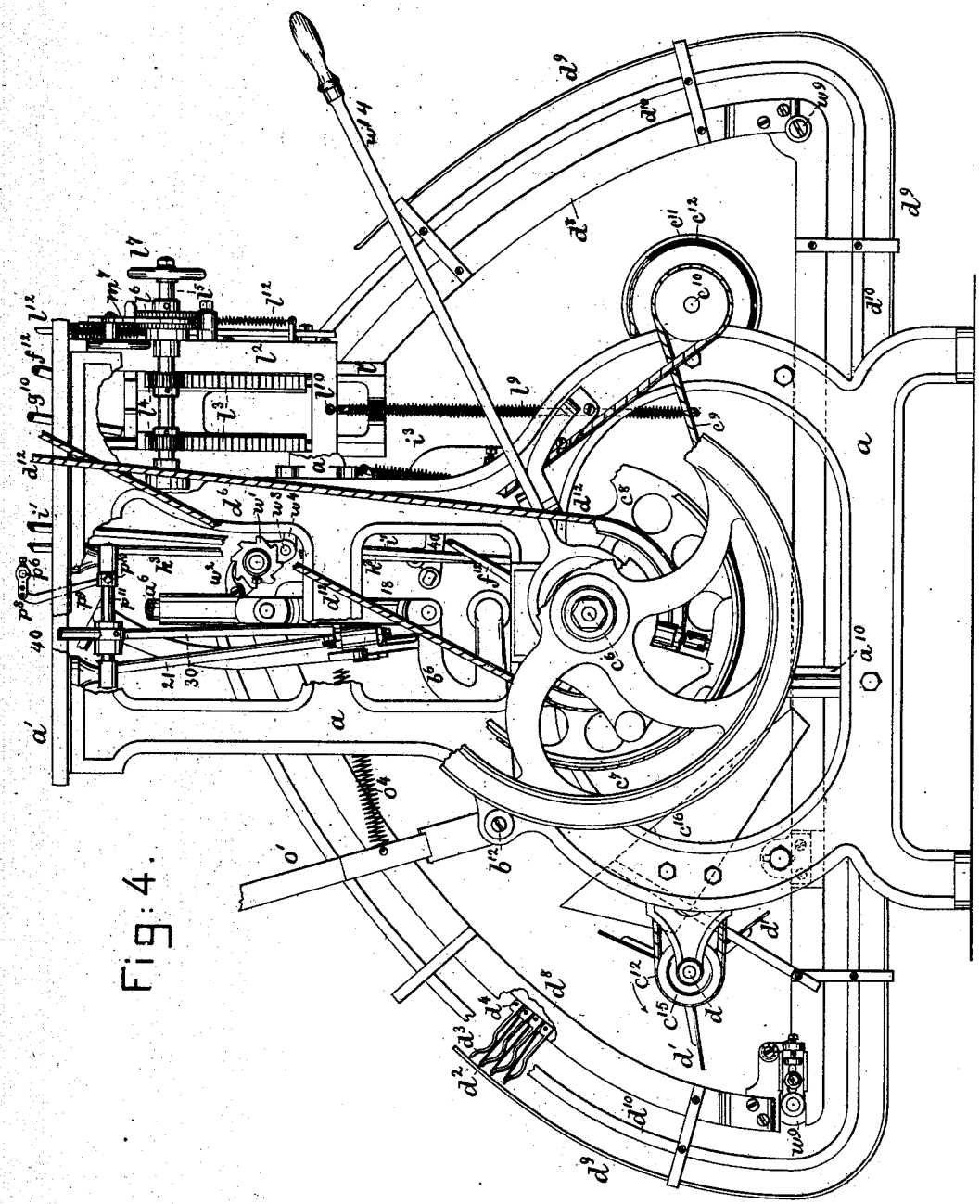

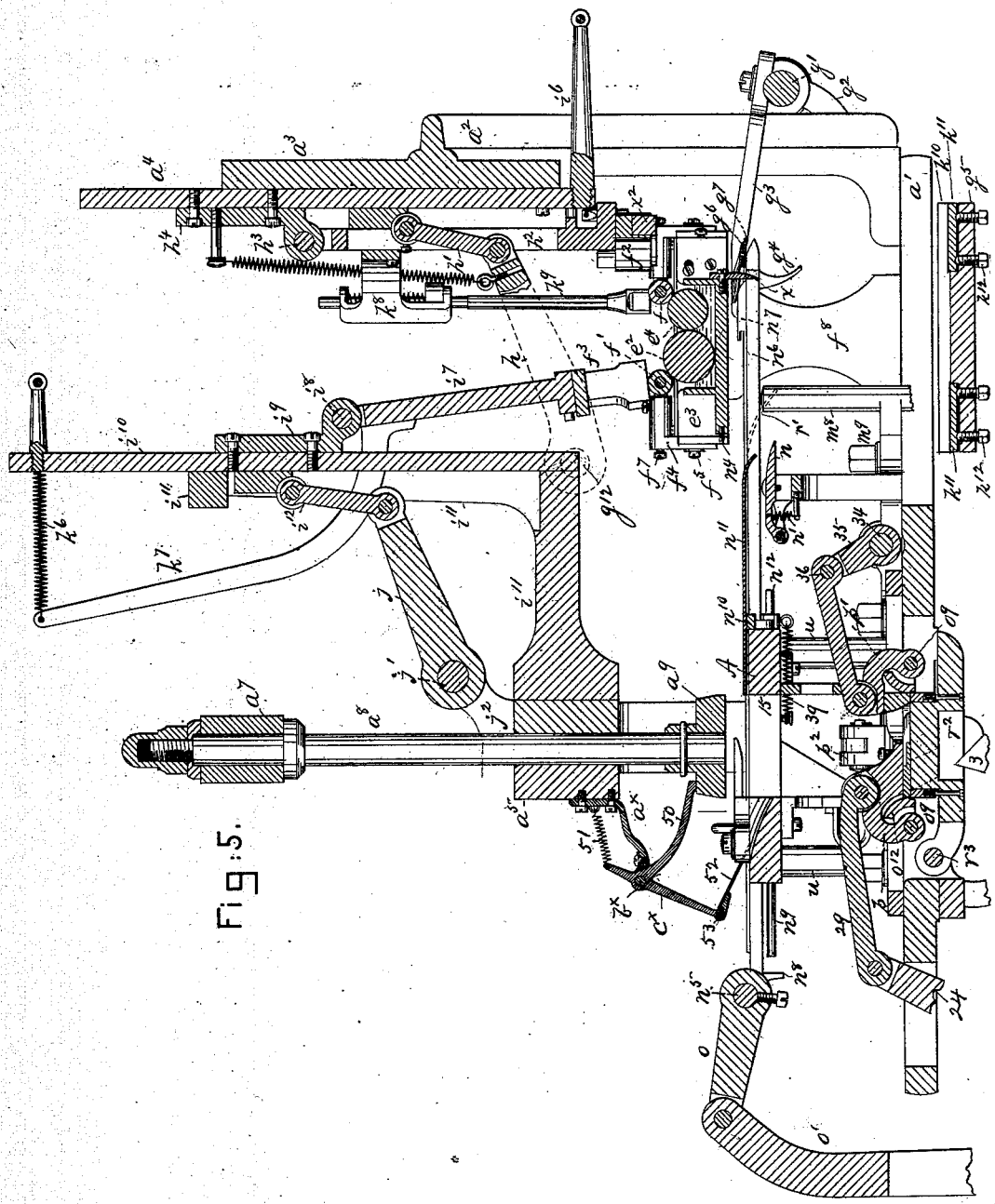

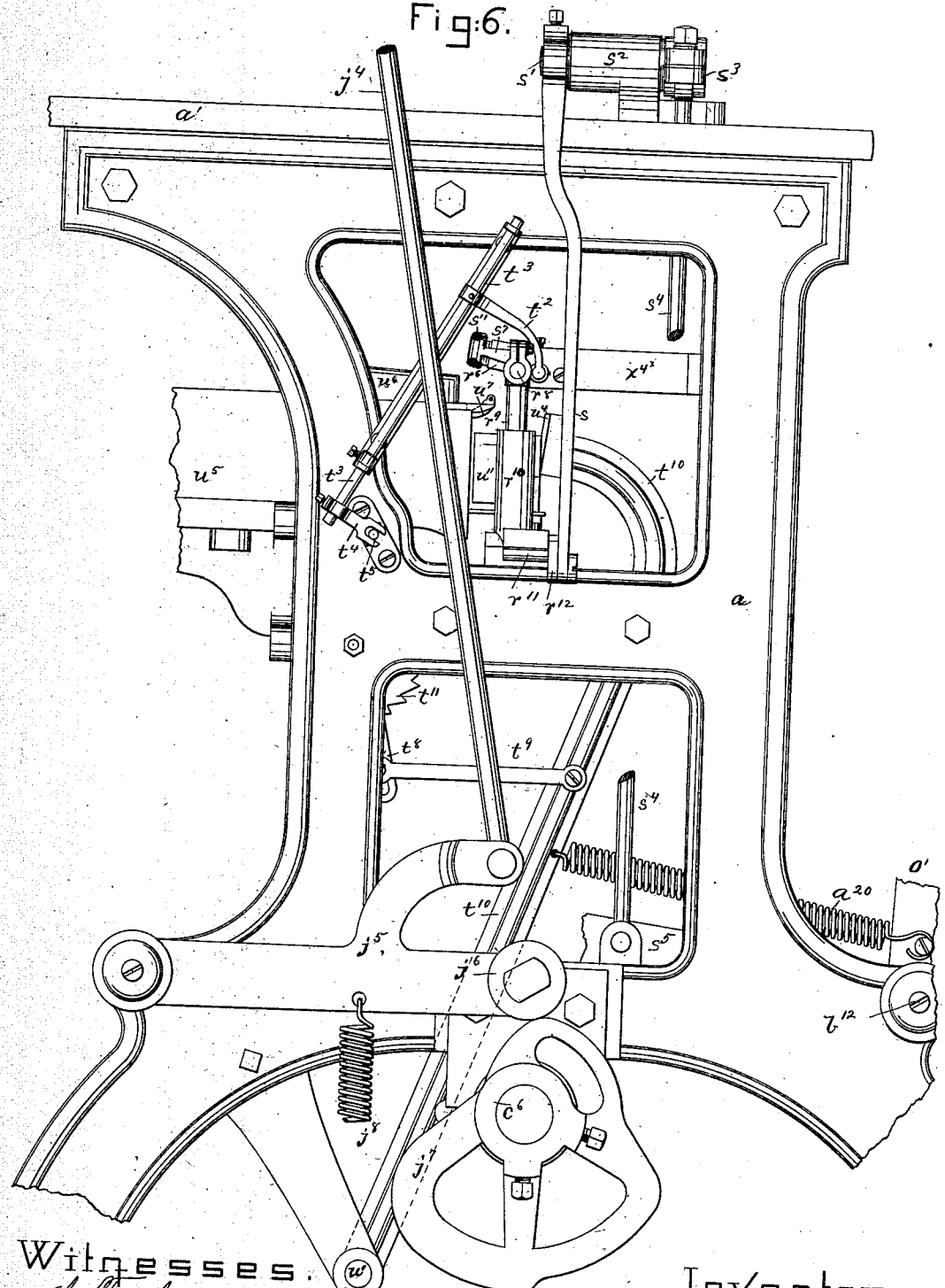

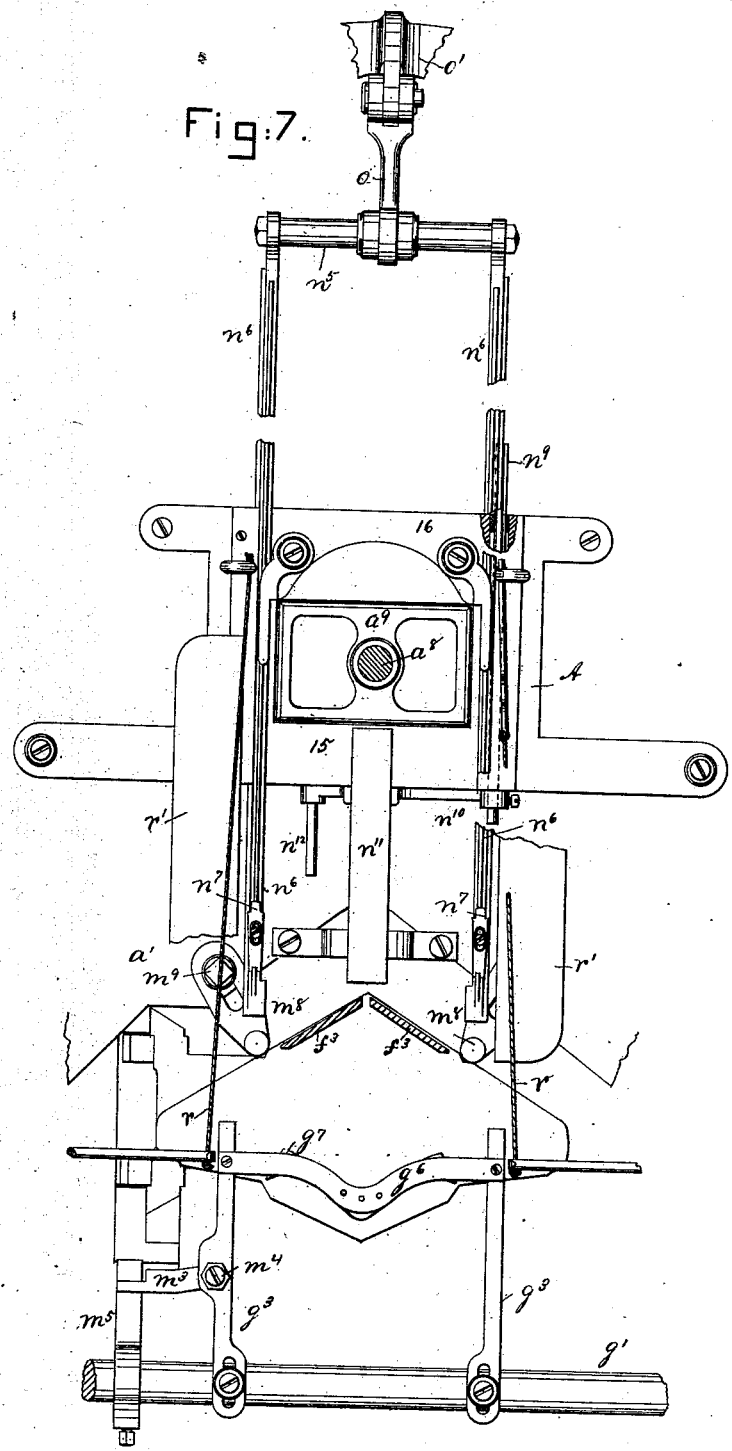

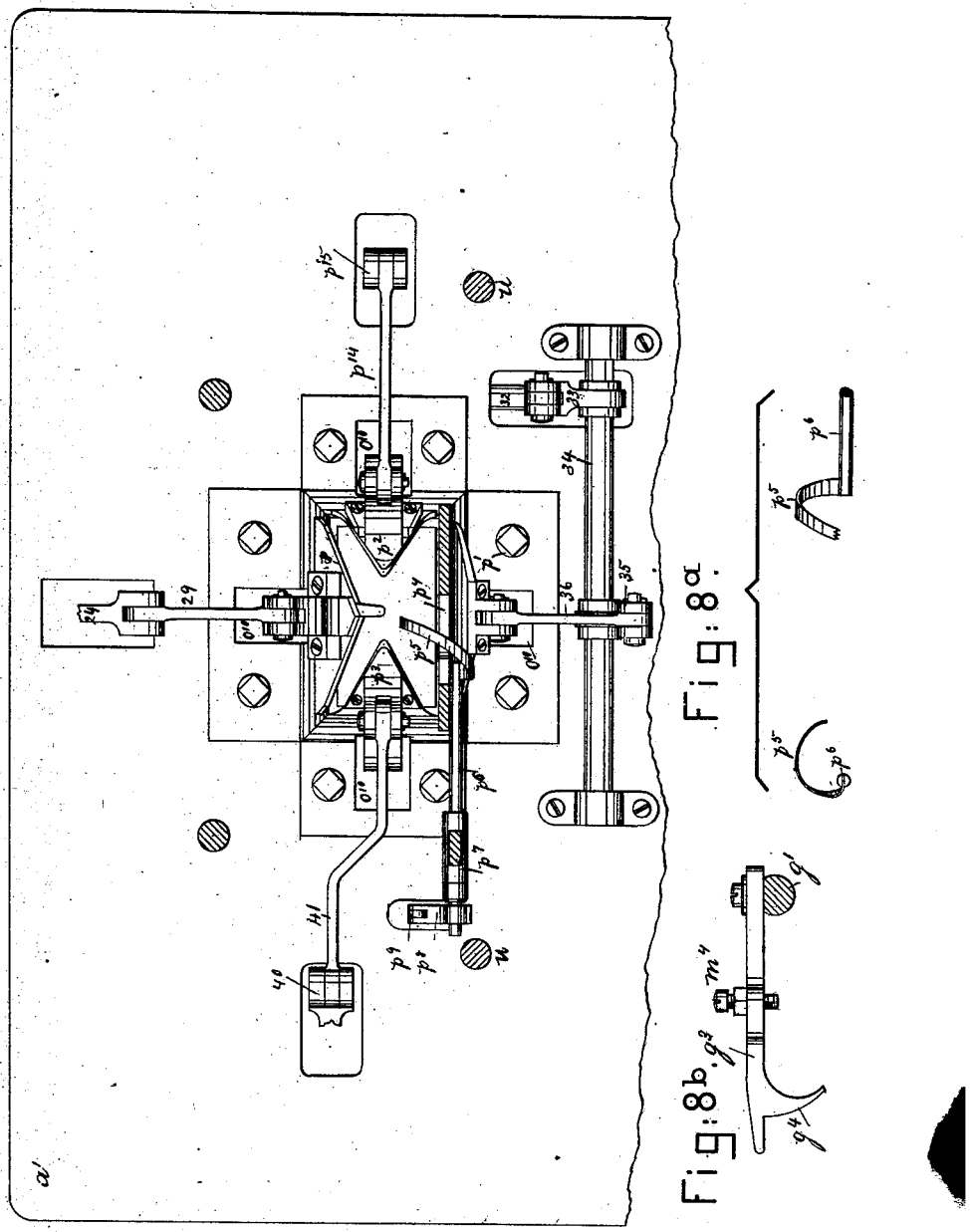
E. PITTMANN.
Envelope Machine.
No. 235,453. Patented Dec. 14, 1880.
17 Sheets—Sheet 8.
Witnesses.
L. F. Connor.
Jos. P. Livermore.
Inventor.
Edward Pittmann,
by Crosby & Gregory,
Attys.

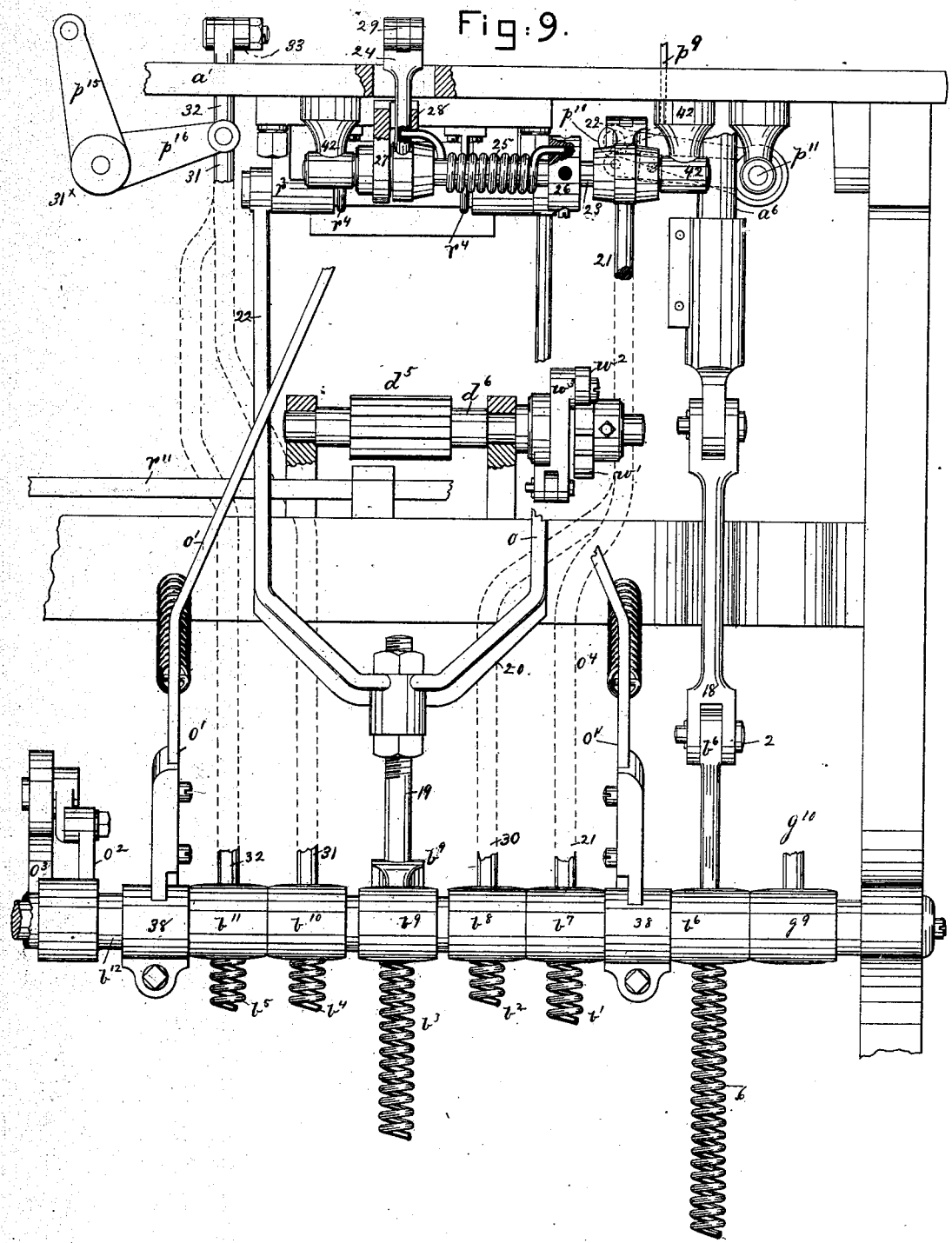

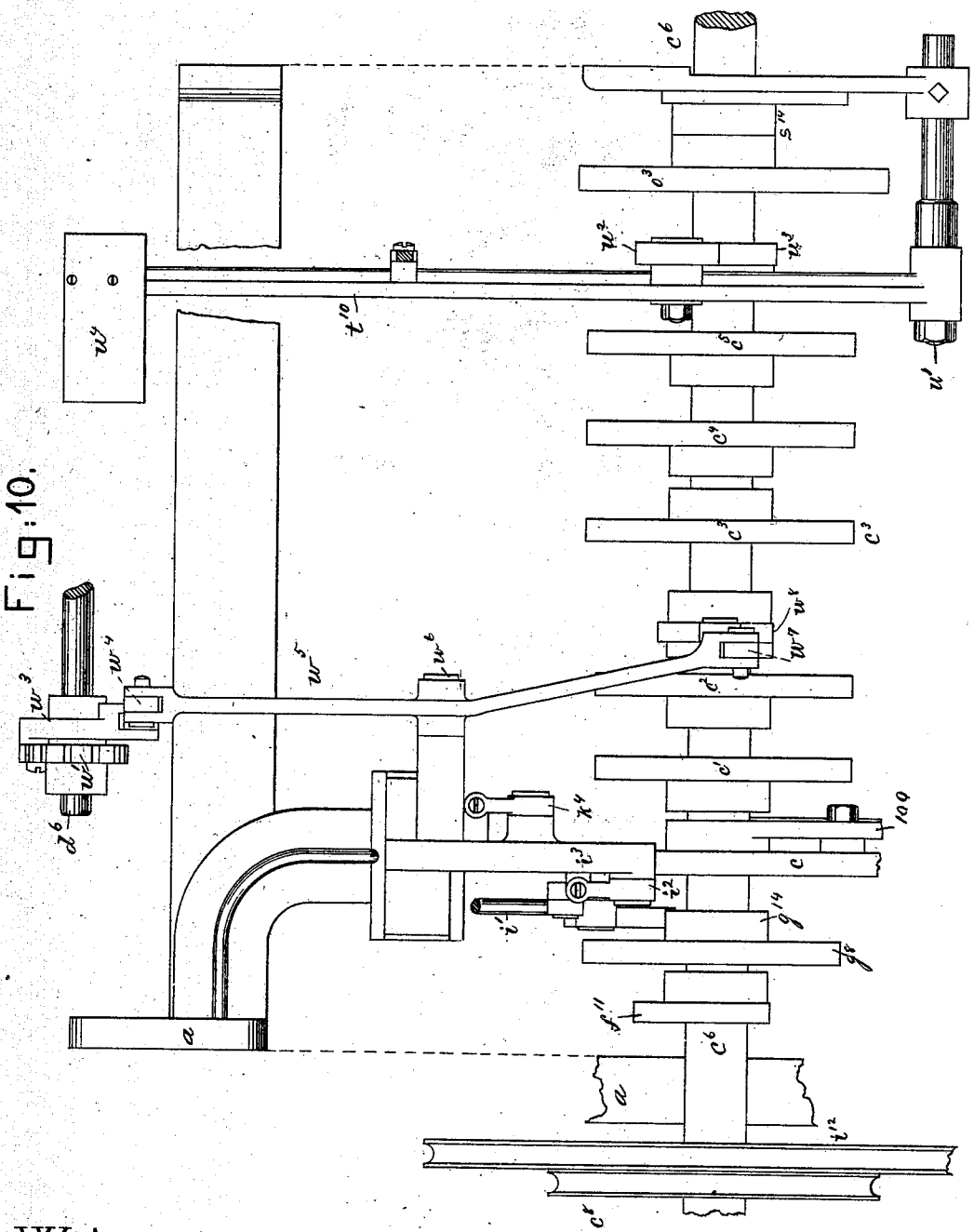

E. PITTMANN.
Envelope Machine.
No. 235,453. Patented Dec. 14, 1880.
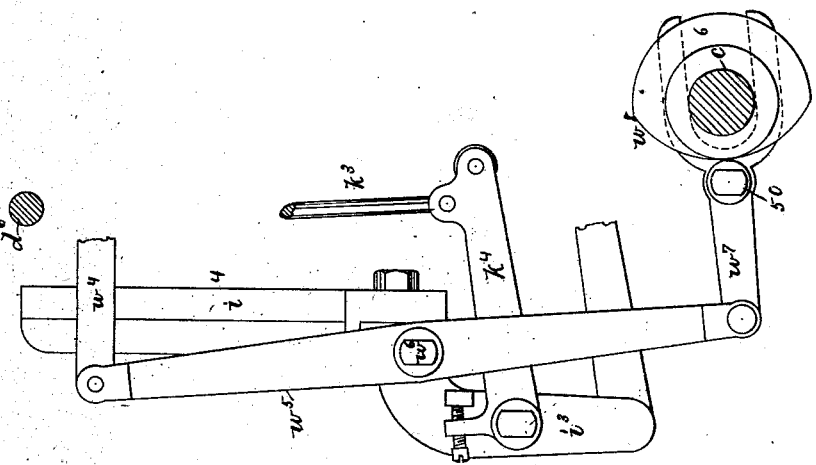
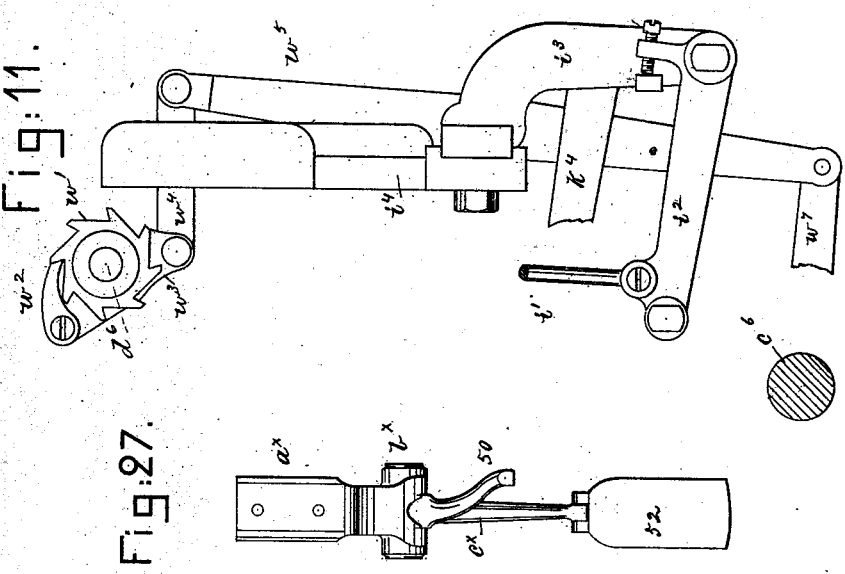
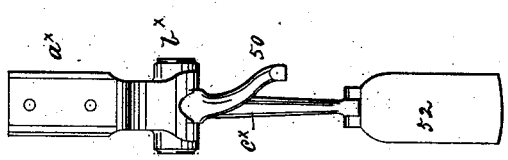
Witnesses.
L. F. Connor.
Jos. P. Livermore.
Inventor.
Edward Pittmann,
by Crosby & Gregory, Attys 17 Sheets—Sheet 12.

E. PITTMANN.
Envelope Machine.

No. 235,453. Patented Dec. 14, 1880.

Witnesses.
L. F. Connor
Jos. P. Livermore

Inventor.
Edward Pittmann,
by Crosby Gregory, Attys

N. PETERS, PHOTO-LITHOGRAPHER, WASHINGTON, D. C.

E. PITTMANN.
Envelope Machine.

No. 235,453. Patented Dec. 14, 1880.

17 Sheets—Sheet 13.

Witnesses.
L. F. Connor
Jos. P. Livermore

Inventor.
Edward Pittmann,
by Crosby Gregory
Attys

17 Sheets—Sheet 14.

E. PITTMANN.
Envelope Machine.

No. 235,453. Patented Dec. 14, 1880.

Witnesses.
L. F. Connor.
Jos. P. Livermore.

Inventor.
Edward Pittmann,
by Crosby & Gregory, Attys.

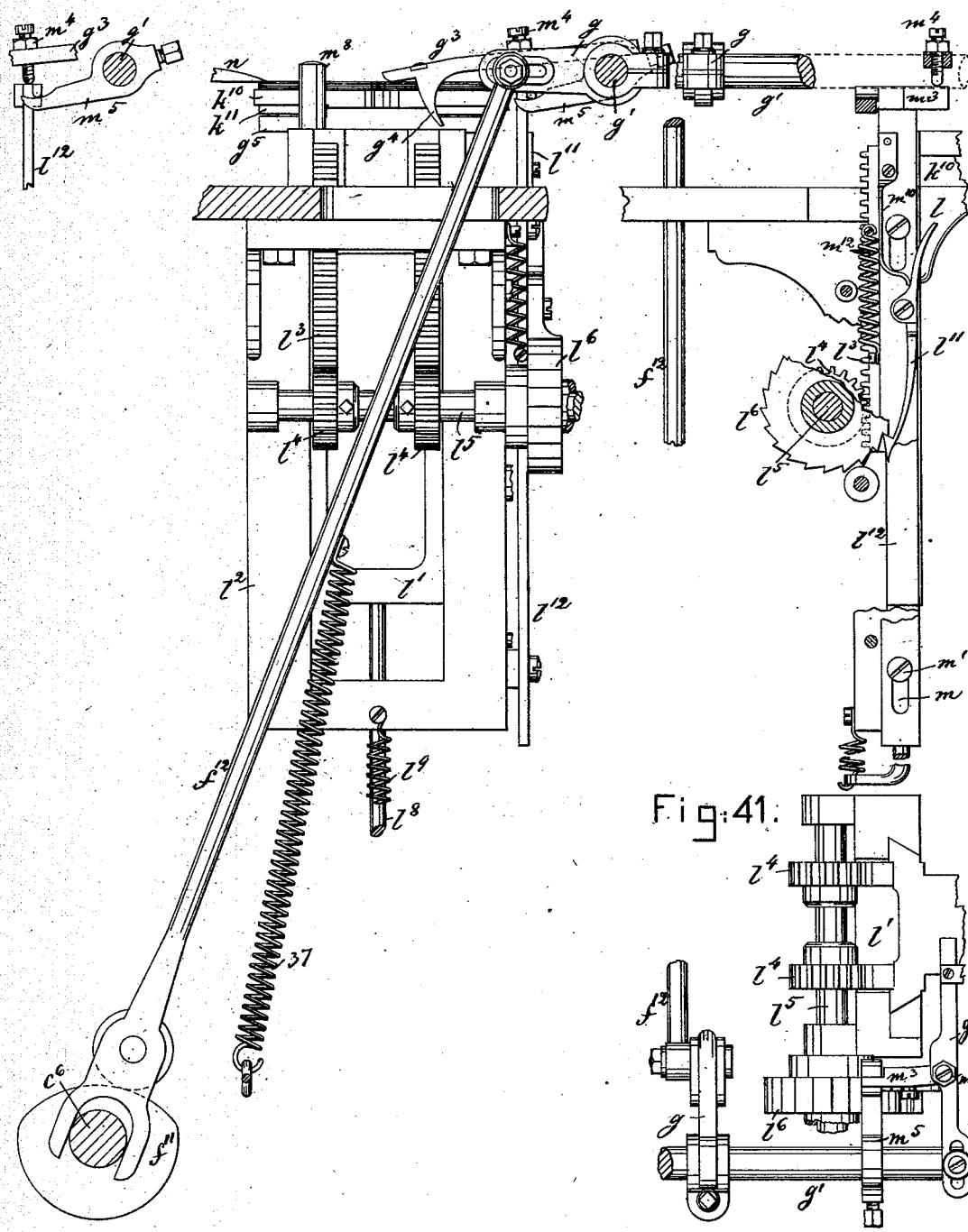

E. PITTMANN.
Envelope Machine.
No. 235,453. Patented Dec. 14, 1880.
17 Sheets—Sheet 17.
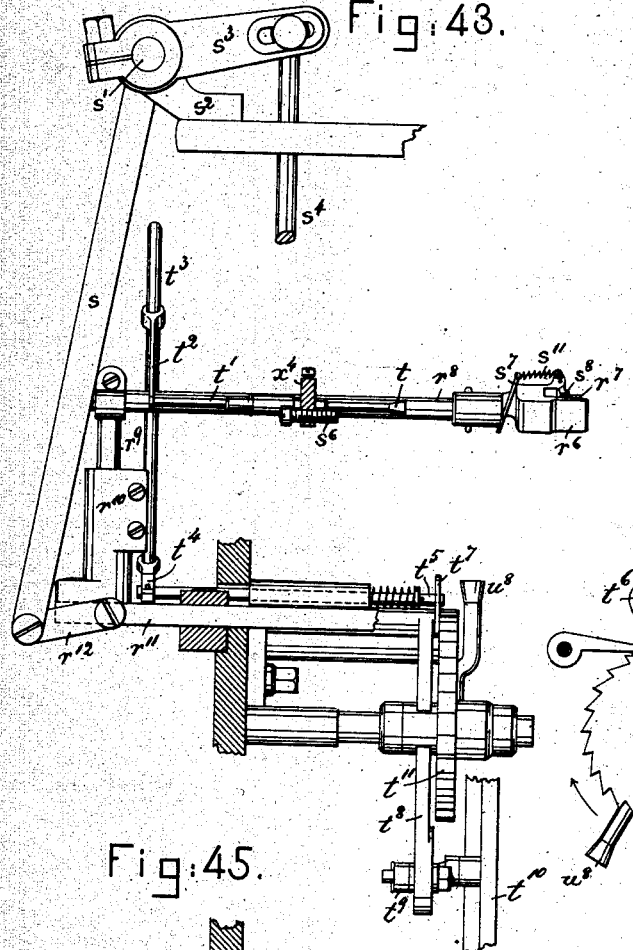
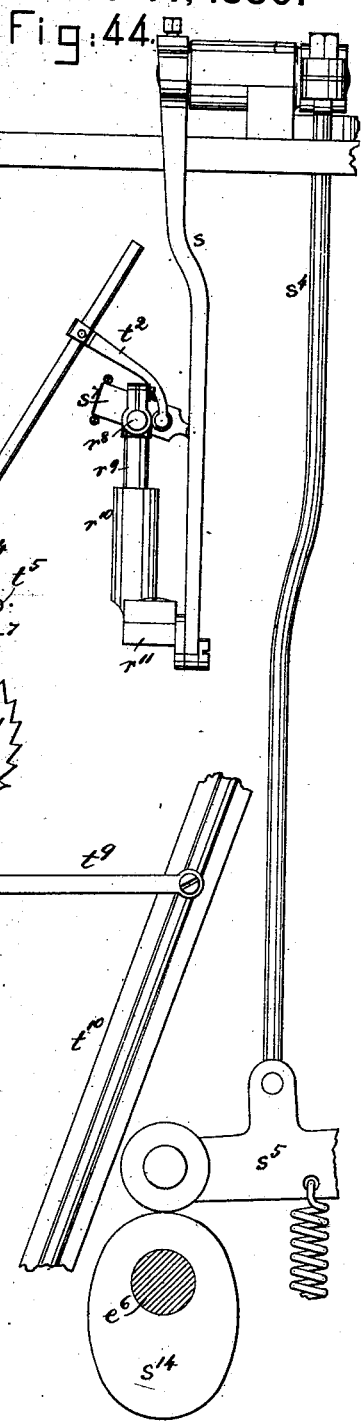
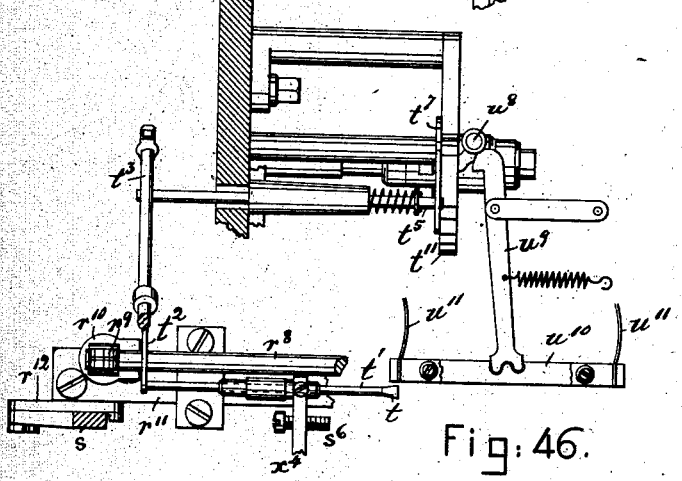
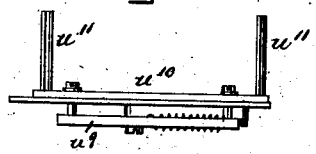
Witnesses.
L. F. Connor.
V. D. Dearborn.
Inventor.
Edward Pittmann
by Crosby & Gregory Attys

UNITED STATES PATENT OFFICE.

EDWARD PITTMANN, OF HARTFORD, CONNECTICUT, ASSIGNOR TO THE PLIMPTON MANUFACTURING COMPANY, OF SAME PLACE.

ENVELOPE-MACHINE.

SPECIFICATION forming part of Letters Patent No. 235,453, dated December 14, 1880.

Application filed December 24, 1879.

*To all whom it may concern:*

Be it known that I, EDWARD PITTMANN, of Hartford, county of Hartford, State of Connecticut, have invented an Improvement in Envelope-Machines, of which the following description, in connection with the accompanying drawings, is a specification.

This invention relates to machines for making envelopes, and has for its objects to simplify the devices for gumming and presenting the envelope-blanks to the folding mechanism to be folded, to enable the machine to work more rapidly and with less waste of material.

In this my machine the mechanism for folding the envelope-blanks, such as the plunger and the side and flap folders, are substantially the same as represented in United States Patents No. 177,048 and No. 71,252, with the exception that I have added to the seal-flap folder a guard to keep the seal-flap from coming in contact with the other parts of the envelope as it is being pressed at its folds, and I have made the back flap so that its pressure can be regulated as desired.

In this my machine the blanks at the top of the pile of blanks automatically fed up at the proper speed are acted upon by a pusher, so as to prevent the seal-flap gummer from gumming but one envelope-blank.

The seal-flap is first gummed while the blank is held down by a presser, which holds it in place, and then the back flap is gummed, the blank at the seal-flap end is relieved from pressure, and as the back-flap gummer rises it lifts the back-flap end of the blank, (it leading in the passage of the blank through the machine,) and the devices which are to feed the said blank forward are passed under it, engaging the blank and carrying it into position under the plunger, when it is forced down through the usual plunger-shaped opening in the folding-table and into the folding-box, in connection with which are side, seal, and back flap folders, operated in the order and by mechanism substantially as heretofore practiced.

The center part of the blank, while being transferred from the position where lifted by the back-flap gummer to a position above the folding-table, is supported by a short reciprocating shield, instead of by a long movable plate connected with a reciprocating head at the rear of the folding-table, as has been common in some old forms of machines in operation, this short shield enabling the plunger to be operated with less dwell at its upstroke.

Instead of discharging the folded blank from the folding-bed into the spaces in the drying-belt by gravity alone, as heretofore common, I discharge it positively by a blow from a striker, the latter operating through a passage made for it in the folder-bed.

I have placed a spring-held separator to act upon the back-flap end of the envelope-blank first lifted from the pile, and have made it adjustable as to its pressure upon the blank, according to the weight or thickness and quality of the paper.

The edges of the box down into which the envelope is folded and pressed are uninterrupted by the usual notches, in which the side and other flap folders were commonly hung, such continuous-acting edge saving very much waste and clogging of the folding parts.

My improved counting mechanism is made operative by the presence of an envelope in the chain-space opposite it when the jaw for drawing the envelope from the chain is moved forward, so that, should the blank be wanting, the mechanism does not operate to count for that forward movement. This insures accurate counting.

In other machines the gummers have usually been connected with their operating devices by springs which yielded more or less after the gummers struck the uppermost blank of the pile of blanks, according to its thickness; but in this my machine the blanks are held upon a spring-sustained table provided with mechanism to move the table and elevate the pile, keeping the top blank of the pile at substantially the same level, and in this way the gummers are carried by rods or bars positively connected with their operating-heads.

Figure 13:
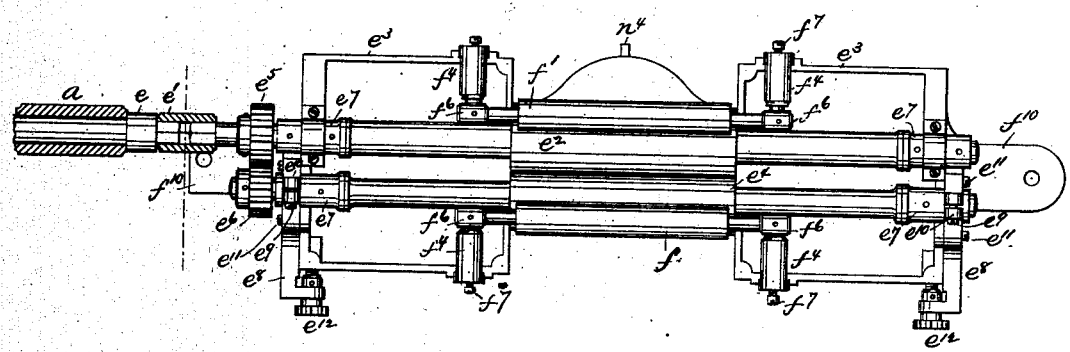
Figure 14:
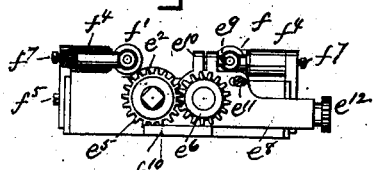
Figure 15:
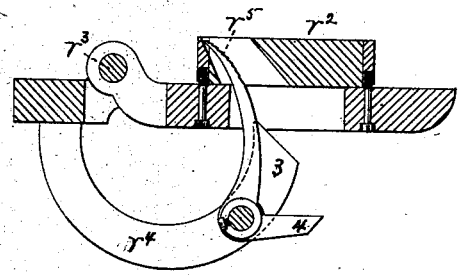
Figure 16:
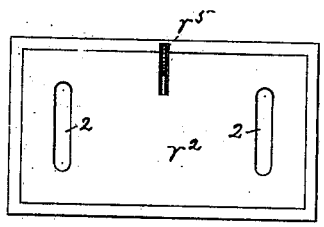
Figure 17:
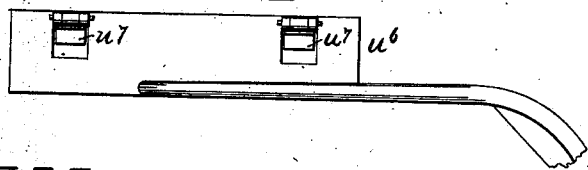
Figure 18:
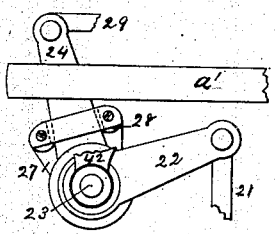
Figure 19:
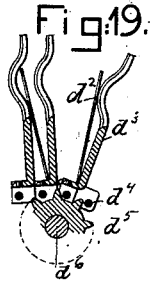
Figure 20:
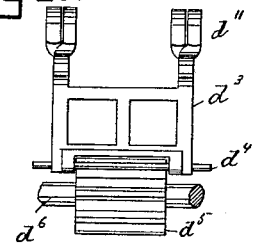
Figure 21:
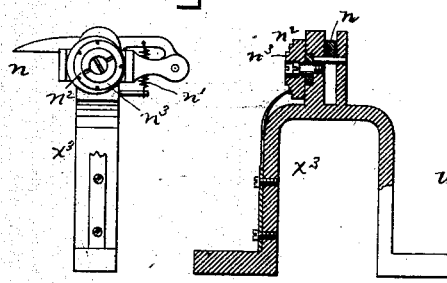
Figure 22:
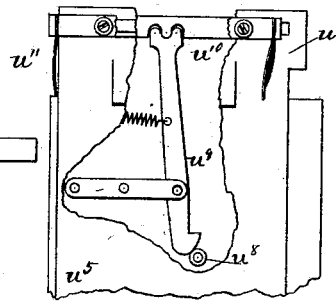
Figure 23:
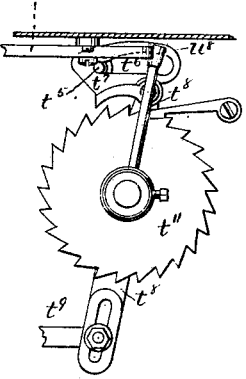
Figure 24:
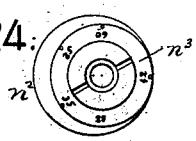
Figure 25:
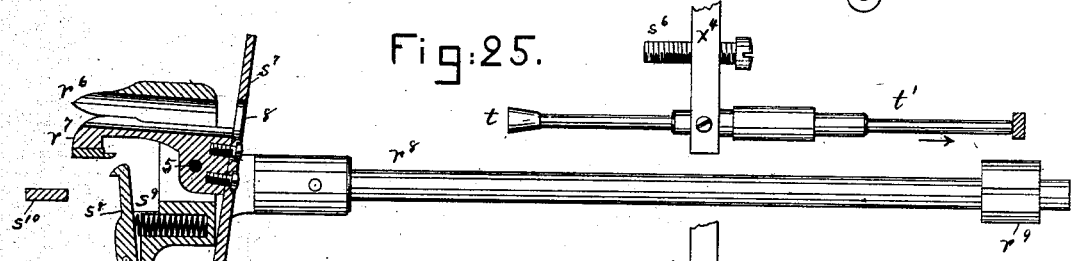
Figure 26:
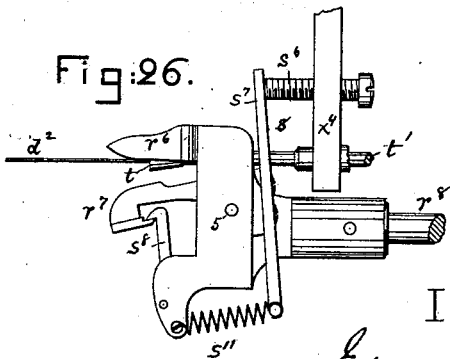
Figure 30:
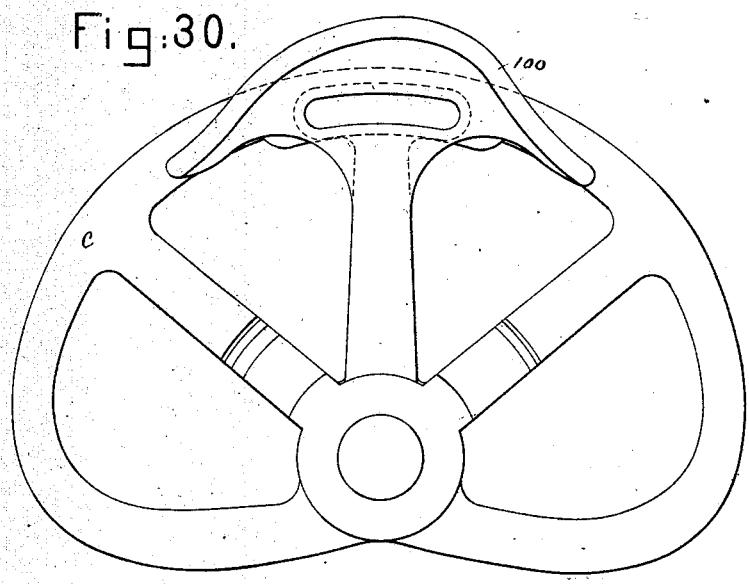
Figure 31:
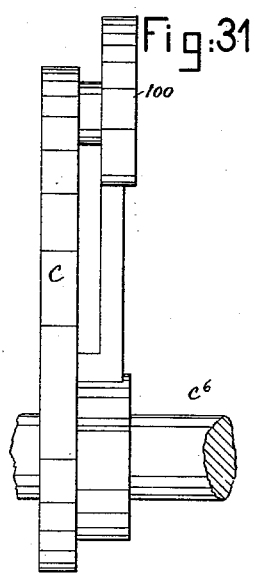
Figure 32:
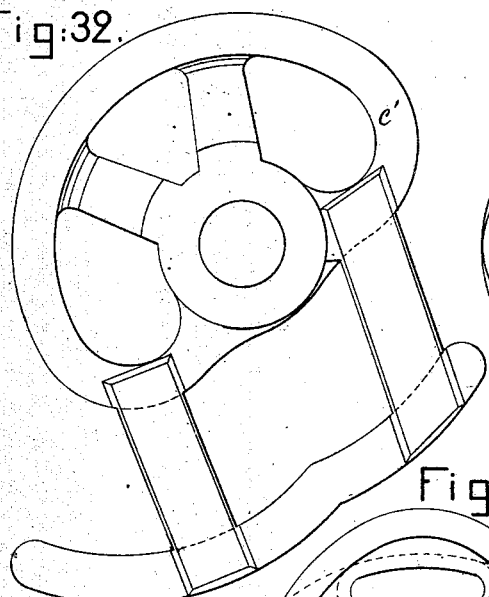
Figure 34:
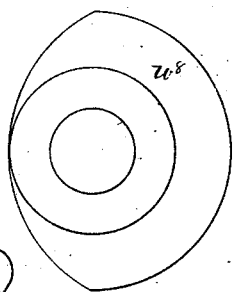
Figure 35:
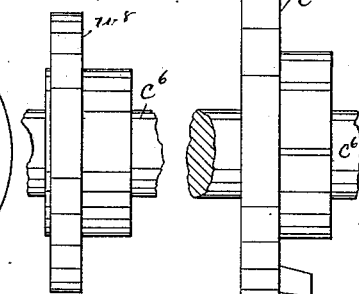
Figure 33:
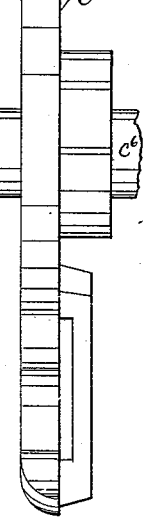
Figure 36:
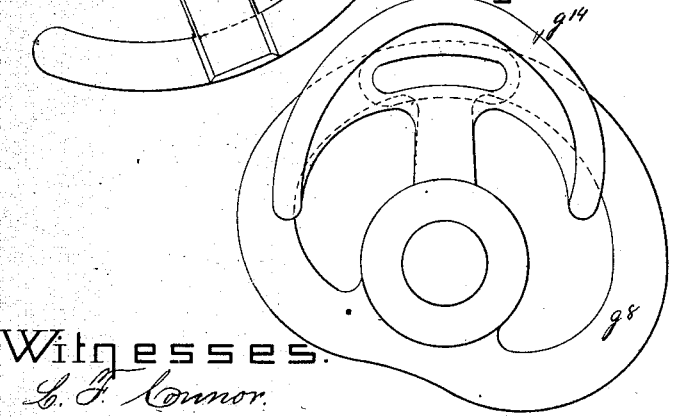
Figure 37:
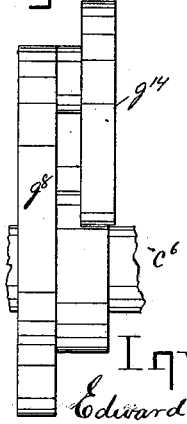
Figure 38:
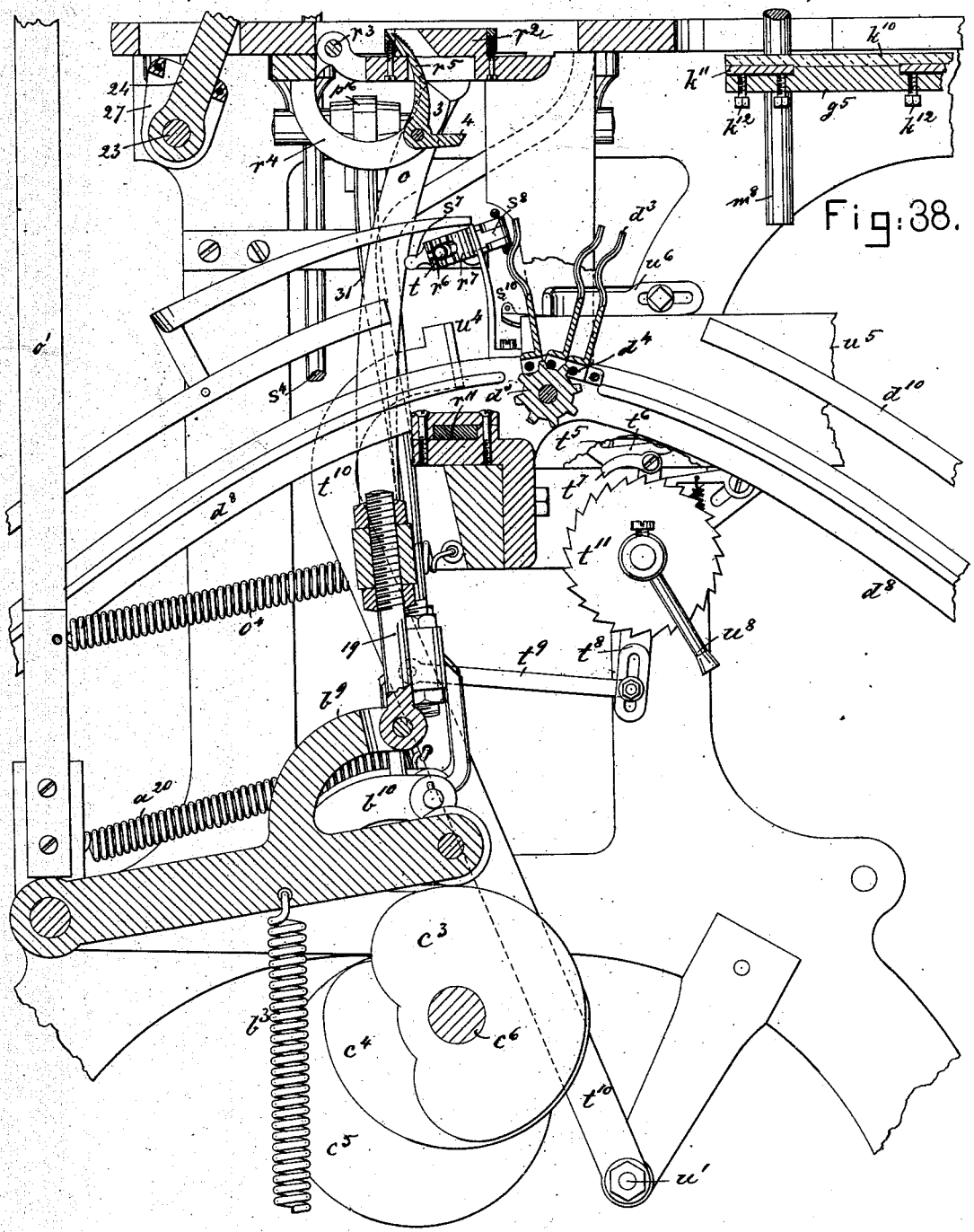

Figure 1 represents, in elevation, the front of one of my improved machines above the top plate, $a'$, the presser-operating rock-shaft being broken out near its center, the arch $a^2$ being also partially broken off, and the rocker-shafts for moving the side-flap folders being omitted to avoid confusion. Fig. 2 is an elevation of the front of the machine, showing most of its parts below the said top plate, $a'$, down to the cam-shaft, which is shown in a separate view from the front in Fig. 10. In this Fig. 2 the blank-supporting table and folder-bed are shown near their lowest positions. The drying-belt and its supporting-frame (shown fully in Fig. 4) are broken away, as are also the numerous connecting-rods which connect with the usual levers actuated by the usual cams on the shaft shown in Fig. 10; Fig. 3, a left-hand side elevation of the parts above the top plate, the separator and links for operating the seal-flap folder being omitted, as they are fully shown in Figs. 5, 8, and 21. In Fig. 3 the seal-flap gummer is supposed to be down far enough to almost touch the pile of blanks, the uppermost one of which is to be gummed, and the back-flap gummer is in position over its gumming-roller, where it has been gummed preparatory to its descent upon the back flap of the blank. Fig. 4 is an elevation of the same side of the machine, showing all of it below the said top plate, a part of the frame-work being, however, broken out. The blank-table is shown in its lowest position. Fig. 5 is a vertical cross-section of the mechanism above the said table. Fig. 6 is a right-hand end elevation of the machine below the said top plate, the said figure showing chiefly the parts for operating the counting mechanism, a part of the envelope-receiving box $u^5$ being shown as broken away. Fig. 7 is a top view of that part of the machine immediately above the table A, (see Fig. 5,) over which the separate envelope-blanks pass, the parts of the machine above and below it being removed the more clearly to show the presser which operates on the blanks while the seal-flap is being gummed and the feeding devices for moving the gummed blanks in position to be operated upon by the plunger. The rod of the plunger is shown in section. Fig. 8 is a top view, showing the rear end of the top plate, with the back and side and seal flap folders and their operating devices above the said top plate, together with the guard for preventing the seal-flap from coming in contact with the folded envelope. The small Fig. 8ᵃ at the side of this Fig. 8 shows details of said guide. Fig. 8ᵇ is a detail of one of the pushing-fingers $g^3$. Fig. 9 is a rear elevation of a part of the machine below the top, it showing especially the devices for imparting motion to the back-flap folder, the device for operating the folding-bed, the rod for actuating the cross-head which carries the plunger $a^9$ of the folding mechanism, the shaft which actuates the drying-chain, and the several levers or arms which reciprocate the rods therein shown as broken off, the rest of the said arms being shown in Fig. 2. The cam-shaft omitted from Fig. 9 is shown in Fig. 10. Fig. 10 is a detail representing the cam-shaft and its cams, viewing the machine from its front, the said figure also showing the stand and the lever for moving the driving-shaft of the drying-chain and the arm for moving the packer that crowds the envelopes into the receiving-box. Fig. 11 is a left-hand side elevation of the stand and its attached parts for holding the levers which, through connecting-rods, impart to the gummers their horizontal motions, and also the lever which actuates the pawl that rotates the shaft that imparts intermitting motion to the driving-belt for the drying-chain. Fig. 12 is an opposite side view of Fig. 11. Fig. 13 is a top view of the gum-box and its rollers; Fig. 14, a left-hand end view thereof; Fig. 15, a sectional detail of the folder-bed elevated with the striker or discharging-finger in a slot therein; Fig. 16, a top view of the platform and finger of Fig. 15. Fig. 17 is a top view of the dog-plate provided with hinged dogs to fall behind the top of each envelope as it is struck by the packer-plate and moved into the receiving-box, to thereby prevent the envelope moving backward when the packer-plate is reciprocated; Fig. 18, a detail of shaft and arms for imparting a yielding motion to the back-flap folder; Fig. 19, a detail of the drying-chain; Fig. 20, a modification thereof; Fig. 21, a detail showing in side elevation and section the separating devices to prevent more than one blank being lifted at the same time. Figs. 22 and 23 are details of the bunching devices for automatically throwing out at the proper time an envelope, in order to assist in dividing them into packages of proper size; Fig. 24, a detail showing the adjustable eccentric for altering the forward position of the separating-finger, that it may lap more or less over the edge of the uppermost blank, according to thickness of paper composing the blank; Fig. 25, a detail of the picking-out mechanism for drawing the folded envelope from the drying-chain, the picker-head being in section. Fig. 26 is a top view, showing the picker-head as holding an envelope; Fig. 27, a detail showing the back-flap protector removed from frame $a^5$ at the rear of Fig. 5; Figs. 28 and 29, top view and section of the box into which the envelopes are forced by the plunger and upon which the folding flaps are pivoted; Figs. 30 to 37, details of cams to be referred to; Fig. 38, a vertical transverse section of the under part of the machine, it corresponding in position with the section Fig. 5 of the upper part of the machine; Figs. 39 and 40, rear and side views of devices for moving upward the bed upon which the envelope-blanks rest; Fig. 41, a detail top view of table-moving devices, the table $l'$ being omitted; Fig. 42, a detail showing the arm for lifting the bar $l^{12}$, to be referred to; and Figs. 43 to 46, details illustrating the various devices in different views that operate the counting and picking-out devices, (shown enlarged in Figs. 22, 23, 25, and 26.)

The frame-work is composed chiefly of side plates, $a$, a top plate or platform, $a'$, an arch, $a^2$, (partly broken away in Fig. 1,) to support the guide-box $a^3$ for the seal-flap-gummer slide $a^4$, and a second cross-arch, $a^5$, which serves as a guide for the reciprocating rod $a^6$, which, through the small cross-arm $a^7$, (common to United States Patent No. 177,048,) actuates the plunger-rod $a^8$, guided in the cross-arch $a^5$. This plunger-rod $a^8$ has attached to it the usual gummed envelope-plunger $a^9$, which forces the gummed envelope-blank down into the folding apparatus.

Extending across the under side of the frame from side to side is a cross-bar, $a^{10}$, (shown in end view, Fig. 4,) to which is attached at the lower ends the springs $b$ $b'$ $b^2$ $b^3$ $b^4$ $b^5$, which at their upper ends are connected with the forward ends of levers $b^6$ $b^7$ $b^8$ $b^9$ $b^{10}$ $b^{11}$, having their fulcra on a shaft, $b^{12}$, to hold the usual anti-friction rollers on the said levers in contact with the cams $c$ $c'$ $c^2$ $c^3$ $c^4$ $c^5$ on the cam-shaft $c^6$, driven in any usual way by a friction-clutch pulley, the rim only of which is shown at $c^7$, the most of said pulley and rim being broken away to show the compound grooved pulley $c^8$ at the rear of it, (said pulley being also shown at left of Fig. 10,) which, by one belt, $c^9$, drives the shaft $c^{10}$, provided with a cone-shaped grooved pulley, $c^{11}$, one of the grooves of which, by a connecting-belt, $c^{12}$, over the oppositely-inclined conical grooved pulley $c^{15}$, drives the shaft $d$, having upon it the rotating fan $d'$, the speed of which may be varied at will by changing of position of the belt $c^{12}$ into one or the other grooves of the pulleys $c^{11}$ $c^{15}$, to create more or less blast of air to dry the envelope $d^2$, placed between the holding-fingers $d^3$, an air-deflector, $c^{16}$, directing the said air toward the chain. The links of the chain are joined by the rods $d^4$, (see also detail Fig. 19,) to form the envelope-drying chain, the bars of the chain being engaged and moved by teeth of a chain-moving cylinder, $d^5$, on the shaft $d^6$. (See Figs. 9 and 10.) The cross-rods $d^4$ of this drying belt or chain are long enough (see Fig. 20) to rest upon the flanged portions $d^7$ of the stationary chain guiding and sustaining bridge $d^8$, (shown quite fully in Fig. 4, and in cross-section, Fig. 2,) strips $d^9$ and $d^{10}$ at the outer edges of the fingers and at their sides preventing the folded envelopes dropping out or being moved laterally therefrom, except at the proper time and by the proper devices, to be described hereinafter. In Fig. 4 I have shown but a few of the said fingers composing the drying-chain, as they will all be made alike.

To dispense with the strips $d^9$ $d^{10}$, I may and have successfully used on each finger a hooked part, $d^{11}$, as shown in Fig. 20, the said hooked parts being so placed as to pass one beyond the other above the top of the envelope $d^2$ between them.

The second belt, $d^{12}$, driven by pulley $c^8$, is extended upward, crossed, and applied to pulley $d^{13}$, (see Figs. 1, 3, and 4,) placed on and so as to drive the short shaft $e$, which, as shown in section, Fig. 13, has a squared or other irregularly-shaped end to enter a socket or connecting-sleeve, $e'$, which receives the squared or other irregularly-shaped end of the shaft of the main gum-box roller $e^2$, having bearings in the gum-box $e^3$, in which is a second gum-box roller, $e^4$, driven from the shaft of gum-box roller $e^2$ by the pinions $e^5$ $e^6$. The gum-box roller $e^4$ has its bearings $e^7$ made as tubular sleeves clamped in carriages $e^8$ by means of clamping-screws $e^9$, extended through ears $e^{10}$ of the carriages, each carriage $e^8$ being guided by suitable studs, $e^{11}$, and made horizontally adjustable by adjusting-screws $e^{12}$, which enable the roller $e^4$ to be moved toward or from the roller $e^2$, to lessen or increase the quantity of gum which shall be permitted to rise and appear on the upper parts of the said gum-box rollers, to thereby determine the quantity of gum which shall be taken from the said gum-box rollers by the gumming-rollers $f$ $f'$, which run in contact therewith, (see Figs. 13 and 5,) they determining the quantity of gum which shall be applied to the seal-flap gummers $f^2$ and the back-flap gummers $f^3$.

To more completely control the quantity of gum to be taken up by the gumming-rollers and their exact position of horizontality with reference to the acting faces of the said seal and back flap gummers, the bearings $f^4$ for the gumming-rollers are made adjustable vertically by means of screws $f^5$. (See Figs. 1, 5, and 14.)

The journals of the gumming-rollers $f$ $f'$ are held in poppet-heads fitted in the bearings $f^4$, one of which is broken out in Fig. 14, and the said journals are made adjustable horizontally by adjusting-screws $f^7$. This gum-box is supported on rigid standards $f^8$, (see Fig. 1,) screws $f^9$ passing through ears $f^{10}$ of the gum-box.

The first cam, $f^{11}$, on the main shaft $c^6$ reciprocates the link $f^{12}$, (see Fig. 4,) which at its upper end (see Figs. 1, 3) is connected with the arm $g$ of the presser-operating rock-shaft $g'$, having its bearing in ears $g^2$ on the top plate, $a'$, said rock-shaft having connected with it blank-pushing fingers $g^3$, (see Figs. 5 and 7,) provided with pushers $g^4$, (see separate detail Fig. 8$^b$,) which pushers operate upon the edges of the pile of blanks which rest on the movable bed $g^5$, thereby placing the upper blank of the pile in such position with relation to the blank or blanks immediately under it that only the uppermost blank can receive upon it gum from the seal-flap gummer $f^2$. These fingers $g^3$ have attached to them a cross-bar, $g^6$, (see Fig. 7,) upon the under side of which is attached a presser-plate, $g^7$, (see Figs. 1, 5, and 7,) which presser-plate is, by the action of rock-shaft $g'$ and fingers $g^3$, thrown down positively, so as to press upon each envelope-blank just back of that portion of the seal-flap which is to be struck and gummed by the seal-flap gummer $f^2$, which descends upon and gums the said seal-flap just before the back-flap gummer $f^3$ descends upon and gums the back flap of the blank.

The second cam, $g^8$, (see Fig. 10,) on the cam-shaft $c^6$ acts upon and lifts an arm, $g^9$, (see Figs. 2 and 9,) having its fulcrum on the rock-shaft $b^{12}$. The said arm $g^9$ is connected by a rod, $g^{10}$, (see Figs. 1, 2, 3,) adjustably attached to the arm $g^{11}$ of the rock-shaft $g^{12}$, connected by an arm, $h$, (see Fig. 3 and dotted lines, Fig. 5,) with a link, $h'$, attached at its upper end to the slide $a^4$, which imparts vertical motion to the seal-flap gummer $f^2$. This seal-flap gummer is attached to the lower end of an arm, $h^2$, pivoted at $h^3$ upon a bracket, $h^4$, attached to the slide $a^4$. (See Fig. 5.) This arm $h^2$ has at one side of it (see Fig. 3) a roller, $h^6$, which, when the slide $a^4$ is elevated, is acted upon by the face $h^7$ of a lever, $h^8$, pivoted at $h^9$ to the guideway $a^3$. This lever is connected by link $h^{10}$ with an arm, $h^{11}$, on a rock-shaft, $h^{12}$, having a second arm, $i$, which, by a connecting-rod, $i'$, is attached to the short lever $i^2$, having its fulcrum on the adjustable bracket $i^3$, secured to the stand $i^4$. (See Fig. 11.) This arm $i^2$ is acted upon by the third cam, (marked $g^{14}$.) This arm $h^8$ at proper times imparts to the arm $h^2$ a vibrating or horizontal movement, which brings the acting face of the seal-flap gummer in contact with the gumming-roller $f$, drawing the same over the roller in the direction of the center of the gum-box, after which, and before the seal-flap gummer is moved backward to descend in contact with and so as to gum the seal-flap of the top blank of the pile of blanks, the slide $a^4$ has imparted to it a very slight lift by reason of the configuration of its actuating-cam $g^8$ on the main shaft before described, which thereby lifts the seal-flap gummer just above the gumming-roller $f$, thereby obviating contact with the said roller on its backward movement; otherwise the gum would be taken from the seal-flap gummer by the gumming-roller.

The arm $h^2$, which carries the seal-flap gummer $f^2$, is moved outwardly in opposition to the lever $h^8$ by means of springs $i^5$, one of which is shown in Fig. 3 and both in Fig. 1, they being attached to a cross-bar at the end of or to a rigid stud, $i^6$, connected with the slide $a^4$. (See Fig. 5.)

By causing the seal-flap gummer to descend upon and apply gum to the seal-flap while the blank so operated upon is held by the presser $g^7$, I am enabled to insure that a greater amount of gum be applied to the seal-flap than to the back flap, and that the back-flap gummer, which applies the least gum, shall always pick up the blank, which would not be the case if the seal-flap and back-flap gummers operated on the upper blank simultaneously and the presser was omitted, for the more gum of the seal-flap would frequently hold the blank back.

In this my machine the seal-flap gummer is made to gum the seal-flap while held in position by the presser $g^7$, and just as the seal-flap gummer and presser rise to release the seal-flap of the blank the back-flap gummer $f^3$ descends and gums the back flap, the blank being at that time relieved from all other pressure, so as to be readily lifted by the ascent of the back-flap gummer, it meeting with no other opposing or counteracting influence by reason of any other part of the machine holding the blank.

The arm $i^7$, which carries the back-flap gummer $f^3$, is pivoted at $i^8$ on a bracket, $i^9$, attached to the slide-bar $i^{10}$, which is guided by and reciprocates in the guiding-head $i^{11}$, connected with the cross-beam $a^5$, (see Fig. 5,) the said slide-bar $i^{10}$ receiving its vertical motion through a link, $i^{12}$, connected with an arm, $j$, of a rock-shaft, $j'$, having its bearings in ears $j^2$, connected with the cross-bar $a^5$, an arm, $j^3$, at the opposite end of the said rock-shaft (shown in dotted lines in Fig. 3 and in Fig. 1) being connected by a link, $j^4$, (see Fig. 6,) with a lever, $j^5$, having a roller, $j^6$, which rests upon the cam $j^7$, (omitted from Fig. 10 because located outside the frame $a$,) a spring, $j^8$, holding said roller in operative contact with said cam.

Referring to Fig. 3, it will be noticed that the arm $i^7$ has a roller, $j^9$, upon it, which is acted upon by the lever $j^{10}$, pivoted at $j^{11}$ upon the head $i^{11}$, said lever $j^{10}$ being connected by link $j^{12}$ with the arm $k$ on a rock-shaft, $k'$, having its bearing in a suitable sleeve, $k^{13}$, supported by the cross-beam $a^5$, the said rock-shaft $k'$ having at its right-hand or opposite end an arm, $k^2$, which, by a rod, $k^3$, is attached to a short lever, $k^4$, pivoted upon the bracket $i^3$, (see Figs. 10, 11, and 12,) said rock-shaft $k'$ and its connection operating to move the back-flap gummer when elevated by cam 100 (shown fully in Fig. 30 and partially in Fig. 10) forward into contact with the gumming-roller $f'$ to supply it with gum, the slide-bar $i^{10}$ being lifted at the proper time by the cam $j^7$, before described, on the main shaft $c^6$, to thereby lift the back-flap gummer high enough to prevent it, in its back motion, from coming in contact with the gumming-roller $f'$.

The arm $i^7$, carrying the back-flap gummer, is moved backward in opposition to the movement of the lever $j^{10}$ by means of suitable springs, $k^6$, connected with arms $k^7$, attached to and projecting upwardly from the slide-bar $i^{10}$. (See Fig. 3.)

Attached to the part $h^2$ of the seal-flap gummer is an arm, $k^8$, (see Fig. 1,) which carries a side-flap gummer, $k^9$, which is properly supplied with gum and made to descend upon one of the side flaps at the same time that the seal-flap gummer strikes it.

The bed $g^5$, which progressively and intermittingly elevates the pile of envelope-blanks, will preferably be provided upon its top (see Figs. 2 and 5) with a thick yielding covering-sheet of india-rubber, $k^{10}$, so as to furnish a yielding surface. This sheet of rubber $k^{10}$ will be supported at front and back upon tipping-plates $k^{11}$, having their fulcra on adjustable screws $k^{12}$, which permit said plates $k^{11}$ to rock in the direction of their length when the blanks are acted upon by the gummers. These plates may be more or less elevated centrally and along their longer sides, to enable said bed and plates, with their pile of envelope-blanks, to be brought to the proper level to be correctly gummed, whatever may be the inequalities in the blanks at or near their edges. This bed $g^5$ is attached to a horizontal table-like portion, $l$, (see Fig. 2,) of a slide, $l'$, (see Fig. 4,) held in a guideway, $l^2$, depending from the top plate, $a'$. This slide $l$ has at its rear side two series of rack-teeth, $l^3$, each engaged by a pinion, $l^4$, (see Fig. 4,) on a shaft, $l^5$, provided with a ratchet-wheel, $l^6$, and with a hand-wheel, $l^7$. A rod, $l^8$, (see Fig. 2,) connected rigidly with and extended downwardly from the slide $l'$, is at its lower end connected with a strong spiral spring, $l^9$, which at its upper end (see Fig. 4) is connected at $l^{10}$ with the depending bracket $l^2$, said spring $l^9$ being sufficient to substantially counterbalance the weight of the slide-frame $l'$, the table $g^5$, and the pile of envelope-blanks thereon. In Fig. 4 the spring $l^9$ almost hides the rod $l^8$.

Instead of connecting the gummers and their actuating device by means of springs, so as to permit the gummers to descend gradually farther and farther, to adapt themselves to the varying position of the upper blank, according to the thickness of the pile of blanks, as heretofore commonly done, I reciprocate the seal and back flap gummers the same distance at each operation. In order to be able to operate the gummers $f^2 f^3$ in this way, I have provided means for intermittingly elevating the pile of envelope-blanks, so as to keep the uppermost blank at the proper and at substantially the same level to be correctly operated upon by the gummers. This is done by means of the pinion $l^4$ on the shaft $l^5$, its ratchet-wheel $l^6$ being engaged and actuated by the pawl $l^{11}$ on the reciprocating pawl-carrier $l^{12}$. This pawl-carrier, slotted, as at $m$, to receive the headed bolt $m'$, and held up by a spring, $m^2$, has at its top a head, $m^3$, (see Fig. 2,) which rests upon the arm $m^5$, connected with the rock-shaft $g'$ at the rear of arm $g$. At each descent of the presser $g^7$ upon the pile of blanks this head $m^3$ is struck by the lower end of the adjusting-screw $m^4$, adjustably connected with the arm $g^3$ of the rock-shaft $g'$, that carries the presser, (see Fig. 7,) which causes the pawl-carrying bar $l^{12}$ and pawl $l^{11}$ to descend in accordance with the position of the uppermost blank of the pile. This arm $m^5$ (see Figs. 1 and 7) acts upon the said head $m^3$ and lifts the bar $l^{12}$ as the presser-arm $g^3$ is lifted.

The reciprocations of the pawl-carrying slide will be more or less, according to the thickness of the individual blanks picked up by the gummers, and consequently it may happen that for a number of reciprocations of said slide $l^{12}$ the pawl $l^{11}$ will slip backward and forward against one of the inclined teeth without actually turning the ratchet-wheel, the pile of blanks and their supporting-table being at that time held up by the spring $l^9$; but as soon as a sufficient number of blanks has been taken away as will permit the pawl $l^{11}$ to pass a ratchet-tooth, then the next ascent of the pawl-carrying bar $l^{12}$ will turn the ratchet $l^6$ and shaft $l^5$ and raise the bed $g^5$.

Retrograde motion of the ratchet $l^6$ is prevented by means of the click $m^6$; but when it is desired to lower the table $g^5$ and slide $l'$, the releaser $m^7$ is turned so that a pin, $l^{15}$, (shown in dotted lines, Fig. 2,) at its upper end will strike the upper end of the pawl $l^{11}$ and release it from engagement with the ratchet $l^6$, while the lower end of the releaser $m^7$ will act upon the end of the click $m^6$ and disengage it from the ratchet, thereby leaving the parts $g^5$ $l$ at liberty to be pressed down to receive a new installment of blanks. The rear edges of the blanks are kept in position by posts $m^8$, connected with the top plate, $a'$, by means of screws $m^9$. (See Fig. 2.) A spring, $m^{10}$, retains the pawl $l^{11}$ in operative position.

To prevent the back-flap gummer from lifting more than one blank at a time I have provided a separator, $n$, (see Fig. 5 and details Figs. 21 and 24,) which consists of a finger operated by an easy spring, $n'$, so as to bear lightly upon the uppermost blank of the pile, it permitting the back-flap gummer to pull the blank in contact with it from beneath the separator.

For thin or light-weight paper I have provided means (herein shown as an eccentric, $n^2$) by which to adjust the separator horizontally, to cause it to project farther over the pile of blanks, and in connection with said eccentric I have placed a graduated scale or index, $n^3$, to indicate the exact position that the separator should occupy when operating upon paper of a certain thickness, the said index indicating on its face the number of the paper. Just before the blank is so disengaged from the back-flap gummer the blank carriers or feeding devices which receive the blank lifted by the back-flap gummer $f^3$ are thrust forward under the elevated blank, in order that it may be caught, drawn back, and placed in position to be struck by the plunger $a^9$ and be folded, as usual. This blank carrier or feed (see Fig. 7) is composed of a cross-head, $n^5$, having long fingers $n^6$, provided at their outer ends with blank-catchers $n^7$, to engage the front or seal-flap edge of the blank lifted by the back-flap gummer. As this carrier is moved forward, a toe, $n^8$, (see Fig. 3,) on the cross-head $n^5$ strikes a rod, $n^9$, having at its opposite end a connecting-link, $n^{10}$, which supports the shield $n^{11}$ and moves the said shield forward so that its forward end is placed below the lifted end of the back flap of the blank as it is disengaged from the back-flap gummer, the said shield besides supporting the back-flap end of the blank until it passes the front portion, 15, of the frame A, down through which the blank is carried into the folding-box, also acting as a shield to prevent the back flap from striking the separator $n$. This frame A, provided with an opening of suitable size and shape to receive the plunger $a^9$, is supported by posts $u$.

In all other envelope-machines known to me the flat piece of metal, like the shield $n^{11}$, which is employed to hold up the back-flap end of the blank to prevent it catching against the top of frame A has been connected with the cross-head $n^5$ of the carrier which draws the envelope-blank back, and has been permitted to traverse entirely across the opening in the frame A down through which the plunger $a^9$ descends, the front end of the said blade terminating its backward motion at the rear of the plunger-opening in A. This long traverse of the said plate made it necessary to hold the plunger longer at its upstroke than in this my present plan, and caused the machine to lose time.

I am enabled to increase the speed of the machine by making the shield $n^{11}$ short, giving it only a short movement between the forward edge 15 of the frame and the seal-flap gummer. This shield and holder-plate $n^{11}$ for the back-flap end is moved backward by the spring 39. (See Fig. 5.) The outer end of the link $n^{10}$ is supported by a pin, $n^{12}$, upon which it slides freely.

The cross-head $n^5$ of the carrier or feed device derives its motion from a link, $o$, at the upper end of arms $o'$, fixed to collars 38, attached rigidly to the rock-shaft $b^{12}$, it having a rigidly-connected arm, $o^2$, operated upon by a cam, $o^3$, (see left of Fig. 9 and right of Fig. 10,) on the cam-shaft $c^6$, the said cam moving the said shaft $b^{12}$ positively in one direction, a spring, $o^4$, operating said arms $o'$ in an opposite direction to project the carrier-rod $n^6$ forward.

In other folding apparatus heretofore commonly used the pieces $o^5$ $o^6$ $o^7$ $o^8$, forming the edges of the folding-box, (see Figs. 28, 29,) down through which the blank is crowded by the folding-flaps after the plunger $a^9$ rises from contact with the blank left on the folder-bed $r^2$, have been notched to receive the ears of the back, seal, and side flap folders, as in United States Patent No. 71,252. This I consider objectionable, because the edges of the blanks and bits of paper are apt to be caught in the said joints, causing bad work; and so, also, the oil used to lubricate the said joints is apt to come in contact with the envelope-blank being folded. To obviate this I have made the edges of the four pieces $o^5$ $o^6$ $o^7$ $o^8$ continuous, and have connected or hinged the folding-flaps on pins or bolts $o^9$ in slots $o^{10}$ back of the rounded or front edges, $o^{12}$, of the said pieces of the folding-box, the base or wider portions of the said folding-flaps, properly concaved, moving very near the said rounded edges $o^{12}$.

The seal and side flap folders $p'$, $p^2$, and $p^3$ are operated in substantially the same order of time and by substantially like devices—viz., cams, connecting-rods, and elbow-levers and links—as are shown and described in United States Patent to H. J. Wickham, No. 177,048, to which reference may be had.

In this my machine I have combined with the seal-flap folder $p'$ a seal-flap guard, $p^5$, (see Figs. 8 and 8$^a$,) which at the proper time is thrown against the gummed side of the seal-flap, to prevent it from coming in contact with other parts of the folded envelope as the seal-flap folder presses the seal-flap over. This guard $p^5$ is shown as a helical finger connected with a rock-shaft, $p^6$, held in bearings $p^7$, suspended from frame A, the said bearing-support being shown in section in Fig. 8. This shaft $p^6$ has an arm, $p^8$, connected by link $p^9$ with an arm, $p^{10}$, on the shaft $p^{11}$, (see Fig. 4,) which, by an elbow-lever, 40, and a link, 41, (see Fig. 8,) is connected with and operates the side-flap folder $p^3$, the rock-shaft $p^{11}$ being moved by rod 30, arm $b^8$, cam $c^2$, and spring $b^2$.

The cords $r$ and the smooth plates $r'$ act upon and keep in place the side flaps of the blank being taken to the folding devices by the carrier or feed, all as usual.

The bottom plate or folder-bed, $r^2$, of the folding devices, pivoted at $r^3$, (see Fig. 15,) has slots 2 (see Fig. 16) to receive the ends 3 of arms $r^4$, which act to lift the folded envelope from the said bed $r^2$, and a striker, $r^5$, having preferably a serrated edge, as at Fig. 15, and having a short arm, 4, to be struck by the bottom of the bed $r^2$ as it is lowered, acts to strike the edge of the folded envelope and knock it laterally from the bed into the drying-chain or between its fingers. This striker, operating to remove the envelope positively, enables the speed of the machine to be greatly increased above that which is possible in other earlier machines, all of which, so far as I am aware, have depended upon the action of gravity alone to project the folded envelope between the fingers of the drying belt or chain.

The folder-bed $r^2$ is actuated through forked arm 20, rod 19, arm $b^9$, cam $c^3$, and spring $b^3$. The usual rocker-shaft, 31$^\times$, of the side-flap folder $p^2$, connected by link $p^{14}$ with arm $p^{15}$ of the said rocker-shaft, is turned at the proper times by the connection of the arm $p^{16}$ with the rod 31 and cam-operated arm $b^{10}$, drawn by spring $b^4$. Cam $c^4$ actuates rod 31.

The rocker-shaft 34 of the seal-flap folder $p'$ has its arm 33 connected with rod 32, attached to arm $b^{11}$, having its fulcrum on shaft $b^{12}$, the said arm $b^{11}$ being acted upon by a cam, $c^5$, and being held down by a spring, $b^5$. The seal-flap folder is moved from rocker-shaft 34 by arm 35 and link 36. (See Fig. 8.)

The back-flap folder $p$ is connected by link 29 with elbow-lever 24, mounted loosely on rocker-shaft 23, held in bearings 42, the said shaft having an arm, 22, connected by link 21 with the arm $b^7$, having its fulcrum on shaft $b^{12}$, actuated by cam $c'$ and spring $b'$.

Rigidly secured to shaft 23 is an arm, 27, having an ear, 28, (see Fig. 9,) to stop the forward motion of the arm 24, it being held pressed against said stop by a spring, 25, made adjustable as to its force by an adjusting device, 26, shown as a hub adapted to be confined to the shaft 23 by a set-screw. In this way the back flap may be made to bear or press the envelope with more or less force as it is being folded, according to the class of paper being used.

In this my machine I have made the counting mechanism dependent upon the presence of an envelope in the nippers. The folded envelopes are picked out singly from between the fingers of the belt by means of the nippers, composed of a fixed jaw, $r^6$, and a movable jaw, $r^7$, pivoted at 5, both jaws being attached to a reciprocating rod, $r^8$, held by stud $r^9$, made vertically adjustable in a socket, $r^{10}$, on a guided slide-bar, $r^{11}$, connected by link $r^{12}$ with an arm, $s$, on a rock-shaft, $s'$, held in bearings $s^2$, the opposite end of the said rock-shaft having an arm, $s^3$, connected by link $s^4$ with a lever or arm, $s^5$, (see Fig. 6,) mounted loosely at one end on the rock-shaft $b^{12}$ and operated by the cam $s^{14}$, a suitable spring holding the said arm down. As the nippers reach their back-stroke, a nipper-jaw mover, $s^6$, (see Fig. 26,) strikes the arm $s^7$ of the movable jaw $r^7$ and opens it to discharge the envelope held by the jaws, and the lower jaw, having been operated, is caught and held open by a jaw-holding catch, $s^8$, operated upon by a spring, $s^9$; but as the nipper arrives at its forward position the clutch $s^8$ meets the stop $s^{10}$ (see Figs. 2 and 25) and releases the jaw $r^7$, to close upon or seize an envelope, $d^2$, if present in the chain. The arm $s^7$, acted upon by springs $s^{11}$, is provided with an opening, 8, (see Fig. 25,) and the jaws are so recessed as to permit the passage between them of the head $t$ of the envelope-feeler, the said head being connected with a sliding rod, $t'$, guided in bracket $x^4$.

The rear end of the said rod, when the head $t$ is struck by the end of an envelope present between the jaws of the nippers, will slide the rod in the direction of the arrow next to it and cause it to act upon the arm $t^2$ (see Fig. 6) of an inclined rock-shaft, $t^3$, having an arm, $t^4$, connected with a sliding rod, $t^5$, (see Figs. 2, 6, and 23,) the inner end of which, if an envelope is in place in the nippers and struck by the feeler-head, $t$, moves the slide-rod $t^5$ outwardly and withdraws its inner end from the slot $t^6$ (see Fig. 23) in the pawl or dog $t^7$, pivoted on the pawl-carrier $t^8$, connected by link $t^9$ (see Fig. 6) with the pusher-lever $t^{10}$, and permits it to fall and engage a tooth of and rotate the counting-ratchet $t^{11}$ one step; but if the nippers fail to catch an envelope, then the rods $t'$ $t^5$ will not be operated, and the pawl or dog $t^7$ will be held up, so as not to engage and move the counting-ratchet. In this way the edge of the envelope is made an active member by which to determine whether or not the counting mechanism shall operate.

A spring, $t^{13}$, about the rod $t^5$ (see Fig. 2) holds the rod pressed forward and causes its arm $t^2$ to keep the rod $t'$ forward in position to be struck by the folded end of the envelope held by the nippers.

The packer-bar $t^{10}$ has its fulcrum at $u'$, has a roll, $u^2$, is actuated by a cam, $u^3$, and has at top the packer-plate $u^4$, which strikes the flat side of each envelope as it is drawn out and released from the nippers. This packer crowds each envelope into a box, $u^5$, across the open top of which is an arm, $u^6$, (shown enlarged and in top view, Fig. 17,) and pivoted dogs $u^7$ on the said arm fall behind the top of each envelope, to hold and prevent it moving back with the packer-plate $u^4$.

Attached to the counting-ratchet $t^{11}$ is an arm, $u^8$, (see Figs. 22, 23,) which at each rotation of the said ratchet, it having twenty-five teeth, strikes the lever $u^9$ of the bunching mechanism, the other member of which is a slide-bar, $u^{10}$, with wings $u^{11}$, causing the said devices to project laterally the twenty-fifth envelope then between its wings, to indicate to the attendant the proper place to separate the envelopes in the receiving-box $u^5$ into packages.

Instead of moving the bunching mechanism to project the twenty-fifth envelope beyond all the others, as just described, I may provide the counting-ratchet with fifty teeth, and place at its sides two cam-surfaces which will operate the wings (made broad enough to extend over twenty-five envelopes) whenever twenty-five envelopes are placed therein, leaving every alternate series of twenty-five envelopes projected beyond the adjacent twenty-five.

The lever $w^{14}$ is that which operates the driving clutch-pulley to make it fast or loose.

The chain or belt moving shaft $d^6$ has upon it a ratchet-wheel, $w'$, engaged by a pawl, $w^2$, on a pawl-carrier, $w^3$, connected by a link, $w^4$, with a lever, $w^5$, having its fulcrum at $w^6$ on the stand $i^3$, the said lever having an arm, $w^7$, provided with a roller, 50, acted upon by a cam, $w^8$, the slotted end of said arm $w^7$ embracing the shaft $c^6$. (See Figs. 11 and 12.)

At suitable points the belt or chain is made to run over anti-friction rollers $w^9$, held in bearings, so as to be adjusted to keep the belt taut.

At the rear of the presser $g^7$, and connected with the gum-box, is a finger, $x$, which, as the presser rises and the blank is lifted by the back-flap gummer, strikes the blank and prevents the gum of the seal-flap from coming in contact with the presser.

The seal-flap gummer is composed of a piece of india-rubber, $x^2$, suitably clamped between holding-plates, it applying a broad strip of gum upon the seal-flap.

The separator $n$ is held at the top of a stand, $x^3$, attached to platform $a'$.

It is obvious that the blank-supplying bed $g^5$ might be moved progressively upward by a friction or clutch pawl of usual construction, rather than by the hooked pawl $l^{11}$, and so, also, the shape of the pawl might be varied without departing from my invention.

At the rear of the cross-beam $a^5$ is attached a bracket, $a^x$, upon which, at $b^x$, is pivoted the lever $c^x$, which carries the back-flap protector 52, which is pivoted upon the lower end of lever $c^x$ at 53.

The upper end of the lever is connected with a spring, 51, which so draws upon the lever as to keep the arm 50 in contact with the upper side of the plunger $a^9$ as the latter rises and falls.

The rear bar of the plate A is made thinner at its front than at its rear edge, or is concaved, as shown, and into and upon this concaved part of the bar rests the forward end of the protector 52 during the time that the plunger rises from and again descends to its position, (shown in Fig. 5,) and while the envelope-blank is fed across the plate A. Should the point of the back flap hang down so as to catch upon the edge of the rear bar of plate A, this protector 52 will lift and cause the point of the back flap resting upon it to readily pass the front edge of the said bar. This protector acts to hold up the back-flap end of the blank until the plunger $a^9$, in its descent, is almost ready to strike the blank and force it through the opening in the plate A.

In Figs. 30 to 37 I have shown side and edge views of some of the cams hereinbefore referred to, to illustrate their shapes, some of them being double cams. The cams not shown in side view do not differ from like cams in other envelope-machines now in use.

The spring $a^{20}$, Fig. 6, connects one of the arms $o'$ with the packer-lever $t^{10}$ and holds it back in contact with its operating-cam.

I claim—

1. In an envelope-making machine, seal and back flap gummers connected with sliding heads, and mechanism, substantially as described, to cause the said gummers to always descend to the same point, combined with the vertically-movable blank-supporting table, its rack, and the gear to move it intermittingly upward, and its elastic or yielding covering or cushion, substantially as described.

2. The blank-supporting table $g^5$, combined with the tipping-plate $k^{11}$, to support the envelope-blanks, as described.

3. The blank-supporting table $g^5$, tipping-plates at both its front and rear sides, and the yielding covering-sheet $k^{10}$, substantially as and for the purpose described.

4. The gum-box and gumming-rollers, combined with the reciprocatable gummer-slide held and guided in a head, the gummer, the gummer-carrying arm pivoted to the said head, and mechanism, substantially as described, to vibrate the gummer and cause it to take gum from the gumming-roller, substantially as described.

5. In an envelope-machine, the seal and back flap gummers, their pivoted arms, and connected reciprocatable heads, combined with connecting mechanism, substantially as described, to cause the seal-flap gummer to strike and gum the seal-flap in advance of the descent of the back-flap gummer, for the purpose set forth.

6. The seal-flap gummer $f^2$ and mechanism, substantially as described, to raise and lower it, combined with the single yielding presser-plate $g^7$, adapted to descend upon and extend across the envelope-blank just at the rear of that portion of it which is to receive gum from the seal-flap gummer, and the finger $x$, to prevent the gummed blank from being drawn under and against the presser, substantially as described.

7. The seal-flap gummer and presser to bear upon the uppermost blank, as described, combined with the finger $x$, to detach the blank from the presser as the latter rises, substantially as described.

8. The vibratable arms $g^3$, provided with the pushers $g^4$, to act upon the edges of the blanks and place the uppermost blank in correct position under the gummers, combined with the gummers, substantially as described.

9. The back-flap gummer to lift the blank, and the frame A, through which the folding-plunger works, combined with a short shield, $n^{11}$, its carrier, and means, substantially as described, to reciprocate the said short shield between the front part of the said box and the back-flap gummer, as and for the purpose described.

10. The seal-flap folder $p^4$, combined with the independently-operated guard-finger $p^5$, to pass under and prevent the seal-flap at its gummed part from coming in contact with the other parts of the folded envelope, substantially as described.

11. The back-flap folder, link 29, and arm 24, combined with the operating rock-shaft and connecting-spring 25, to vary the pressure of the back-flap folder upon the envelope being folded, substantially as and for the purpose described.

12. The slotted pivoted folder-bed, arms to strike the side of the folded envelope and lift it above the bed, and the striker $r^5$, pivoted upon the said arms and adapted to strike the edge of the folded envelope and throw it laterally off from the folder-bed, combined with the drying-chain, into which the said envelope is thrown by the said striker, substantially as described.

13. The blank-supporting bed, combined with the separator, to act upon the back flap near the central part of its edge, its easy-yielding spring, and the adjusting device or cam $n^2$, to move the separator $n$ forward, to adapt the position of the finger to paper of different thicknesses and strength, all substantially as and for the purpose described.

14. The combination, with the plate A and plunger, of the back-flap protector, adapted to support the front end of the back flap, substantially as described, while it is being passed over or upon the rear bar of the said plate, substantially as set forth.

15. The intermittingly-movable carrying or drying chain, a nipper adapted to seize and draw from the said chain an envelope, if present, and a feeler to feel for an envelope, combined with the counting mechanism and connecting mechanism, substantially as described, under the control of the feeler, to operate substantially as set forth.

16. The counting-ratchet $t^{11}$, its striking-arm, the pawl-carrier $t^8$, and the lever $u^9$ of the bunching mechanism, combined with the feeler-rod $t'$, the rod $t^5$, and connecting mechanism, substantially as described, between them, to release the pawl-carrier, substantially as set forth.

17. The nipper composed of the jaw $r^6$, the jaw $r^7$, pivoted thereon, its connecting-arm $s^7$, and spring $s^{11}$, combined with the feeler $t$, to operate substantially as set forth.

18. The jaw $r^6$, pivoted jaw $r^7$, and arm $s^7$ and spring, combined with the catch $s^8$ to hold the jaw open, the stops $s^6$ $s^{10}$, and the feeler, all substantially as described.

19. In a gum-box, the gum-box rollers $e^2$ $e^4$, combined with the adjustable gumming-rollers $f$ $f'$, the horizontally-adjustable poppet-heads $f^6$, and vertically-adjustable bearings for the said heads, all substantially as set forth.

20. In combination, the folder-bed, back-flap folder, loosely-pivoted arm 24, spring 25, adjusting device 26 for the said spring, the rocking shaft 23, and connected arm 27 28, to act upon and move the arm 24, all as and for the purpose described.

In testimony whereof I have signed my name to this specification in the presence of two subscribing witnesses.

EDWARD PITTMANN.

Witnesses:
J. HENRY ORR,
F. W. FIELD.